United States Patent [19]
Eyuboglu et al.

[11] Patent Number: 5,159,610
[45] Date of Patent: Oct. 27, 1992

[54] TRELLIS PRECODING FOR MODULATION SYSTEMS

[75] Inventors: Vedat M. Eyuboglu, Boston; G. David Forney, Jr., Cambridge, both of Mass.

[73] Assignee: Codex Corporation, Mansfield, Mass.

[21] Appl. No.: 823,586

[22] Filed: Jan. 16, 1992

Related U.S. Application Data

[63] Continuation of Ser. No. 351,186, May 12, 1989, abandoned.

[51] Int. Cl.⁵ .......................................... H04L 25/34
[52] U.S. Cl. ........................................ 375/18; 371/43
[58] Field of Search ............... 375/17, 18, 27, 38, 375/39, 42, 58, 67, 11, 12; 371/2, 37, 39, 40, 41, 43, 50; 332/9 R, 10

[56] References Cited
U.S. PATENT DOCUMENTS

| | | | |
|---|---|---|---|
| 3,887,768 | 6/1975 | Forney, Jr. et al. | 178/67 |
| 4,077,021 | 2/1978 | Csajka et al. | 332/9 |
| 4,439,863 | 3/1984 | Bellamy | 375/18 |
| 4,483,012 | 11/1984 | Wei | 375/27 |
| 4,553,237 | 11/1985 | Nakamura | 371/37 |
| 4,583,236 | 4/1986 | Kromer et al. | 371/43 |
| 4,597,090 | 6/1986 | Forney, Jr. | 371/43 |
| 4,601,044 | 7/1986 | Kromer, III et al. | 375/17 |
| 4,630,288 | 12/1986 | Longstaff et al. | 375/39 |
| 4,631,735 | 12/1986 | Qureshi | 375/34 |
| 4,646,305 | 2/1987 | Tretter et al. | 371/43 |
| 4,677,625 | 6/1987 | Betts et al. | 375/39 |
| 4,698,809 | 10/1987 | Munter | 371/30 |
| 4,700,349 | 10/1987 | Gallager | 371/30 |
| 4,713,829 | 12/1987 | Eyuboglu | 375/37 |
| 4,720,839 | 1/1988 | Feher et al. | 375/18 |
| 4,755,998 | 7/1988 | Gallager | 371/30 |
| 4,788,694 | 11/1988 | Calderbank | 375/59 |
| 4,807,253 | 3/1989 | Hagenauer et al. | 375/57 |
| 4,873,701 | 10/1989 | Tretter | 371/43 |
| 4,894,844 | 1/1990 | Forney, Jr. | 375/42 |
| 4,959,842 | 9/1990 | Forney, Jr. | 375/39 |

OTHER PUBLICATIONS

Wolf et al. "Trellis Coding for Partial-Response Channels", IEEE Transactions on Communications, vol. Com. 34, No. 8, Aug. 1986, pp. 765-773.

Wei, "Trellis-Coded Modulation with Multidimensional Constellations", Transactions on Information Theory, vol. IT-33, No. 4, Jul. 1987.

Eyuboglu, "Detection of Coded Modulation Signals on Linear, Severely Distorted Channels Using Decision-Feedback Noise Prediction with Interleaving", IEEE Transactions on Communications, vol. 36, No. 4, Apr., 1988.

Chevillat, "Rapid Training of a Voiceband Data-Modem Receiver Employing an Equalizer with Fractional-T Spaced Coefficients", IEEE Transaction on Communications, vol. COM-35, No. 9, Sep. 1987.

Calderbank, "New Trellis Codes Based on Lattices and Cosets", IEEE Transactions on Information Theory, vol. IT-33, No. 2, Mar. 1987.

Forney, Jr., "Maximum-Likelihood Sequence Estimation of Digital Sequences in the Presence of Intersymbol Interference", IEEE Transactions on Information Theory, vol. IT-18, No. 3, May 1972.

Forney, Jr., "Coset Codes—Part I: Introduction and Geometrical Classification", IEEE Trans. on Information Theory, vol. 34, No. 5, Sep., 1988, pp. 1123-1151.

Saltz, "Optimum Mean-Square Decision Feedback Equalization", The Bell System Technical Journal, vol. 52, No. 8, Oct., 1973, pp. 1341-1373.

(List continued on next page.)

*Primary Examiner*—Stephen Chin
*Attorney, Agent, or Firm*—Fish & Richardson

[57] ABSTRACT

In general the invention features mapping a digital data sequence into a signal point sequence for data transmission over a channel characterized by a non-ideal response, by selecting the signal point sequence from a subset of all possible signal point sequences based on the digital data sequence and upon the response, all possible signal point sequences in the subset lying in a fundamental region of a filtered trellis code, the fundamental region being other than a simple Cartesian product of finite-dimensional regions.

37 Claims, 14 Drawing Sheets

OTHER PUBLICATIONS

Kasturia et al., "Precoding for Block Signalling and Shaped Signal Sets", Proc. ICC 1989, Jun.

Forney, Jr. D. et al., "Efficient Modulation for Band-Limited Channels," IEEE, vol. sac-2, Sep. 1984, pp. 632-647.

Ungerboeck, G. "Channel Coding with Multilevel/Phase Signals," IEEE vol. it-28, Jan. 1982, pp. 55-67.

Price, R. "Nonlinearly Feedback-Equalized Pam vs. Capacity, for Noisy Filter Channels," Abstract pp. 22-12-22-17.

"New Automatic Equaliser Modulo Arithmetic," Electronic Letters, Mar. 25, 1971, vol. Nos. 5/6, pp. 138-139.

Messerschmitt, D., "Generalized Partial Response for Equalized Channels with Rational Spectra," IEEE, vol. com-23, Nov. 1975, pp. 1251-1258.

Mazo, James, "On the Transmitted Power in Generalized Partial Response," IEEE, vol. com-24, Mar. 1976, pp. 348-351.

Lee, T-A., "A New Class of Codes Designed for Partial Response Channels," Jan., 1986, pp. 1-80.

Calderbank, A., et al., "A New Approach to High-Density Magnetic Recording," Abstract, pp. 1-45.

Morales-Moreno, F., et al., "Matched Encoder in Combined Binary Trellis Encoding and Systems with Memory," Jan. 1986, pp. 1-30 (plus figures).

Harashima, H. et al. "Matched-Transmission Technique for Channels With Intersymbol Interference," IEEE vol. com-20, No. 4, Aug. 1972, pp. 774-780.

Calderbank, A. et al., "An Eight-Dimensional Trellis Code," IEEE, vol. 74, No. 5 May 1986, pp. 757-759.

Calderbank, A. et al., "Baseband Trellis Codes with a Spectral Null at Zero," Abstract, pp. 1-27.

Calderbank, A. et al., "Binary Convolutional Codes with Application to Magnetic Recording," IEEE, vol. it-32, No. 6, Nov. 1986, pp. 797-815.

Ketchum, John, "Trellis Coding for Partial Response Channels," Abstract presented at IEEE International Symposium, 10/609/86, pp. 1-45.

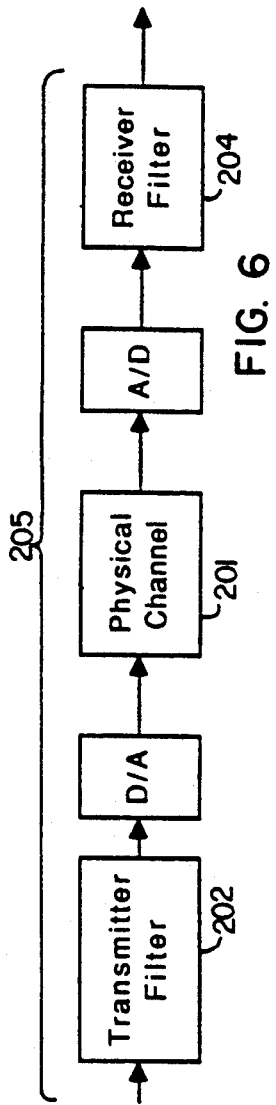
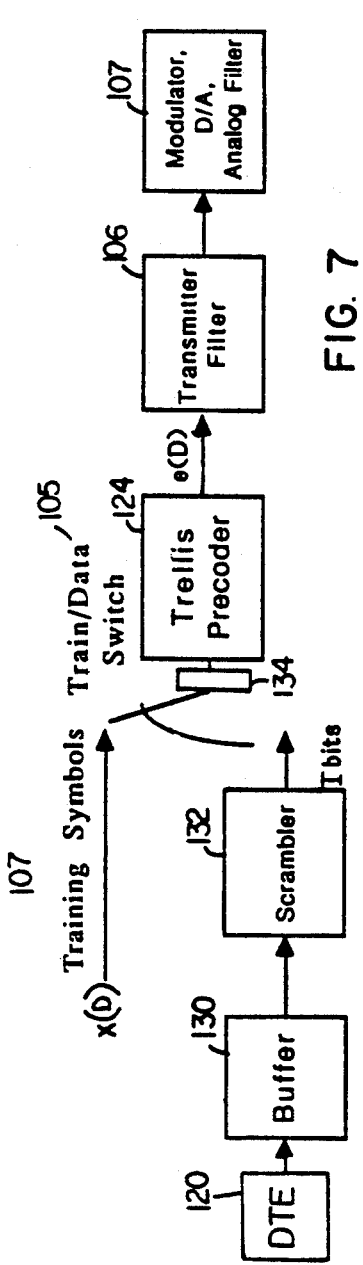
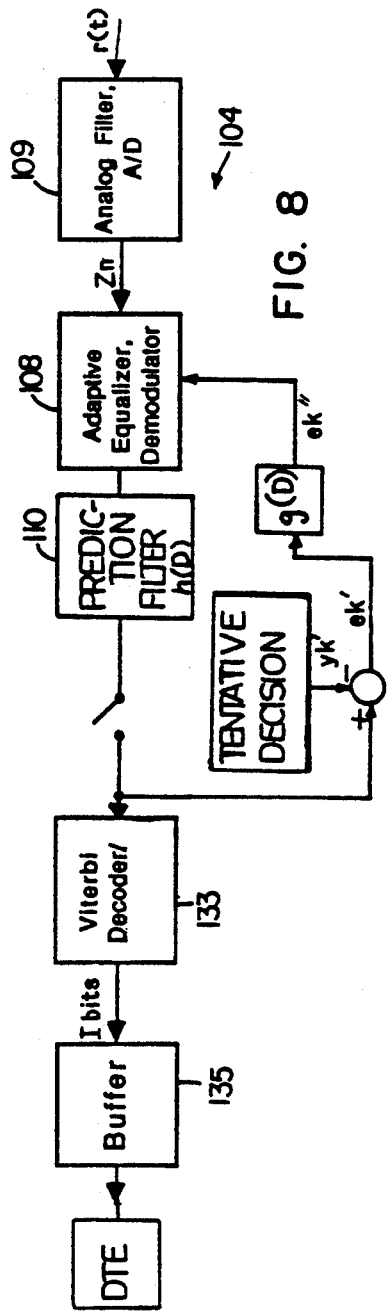

Code Symbols

▨   00   (A)

■   11   (B)

□   01   (C)

▧   10   (D)

TRELLIS PRECODING FOR MODULATION SYSTEMS

This is a continuation of application Ser. No. 07/351,186 filed May 12, 1989, now abandoned.

BACKGROUND OF THE INVENTION

This invention relates to modulation systems for sending digital data via a channel.

Considerable progress has been made in recent years towards approaching the channel capacity of ideal bandlimited Gaussian channels using coded modulation. Ideal Gaussian channels have flat spectra and additive white Gaussian noise.

On ideal Gaussian channels, when the signal-to-noise ratio (SNR) is large, or equivalently when the number of bits per symbol becomes large, the difference between channel capacity and what can be achieved with uncoded modulation systems such as uncoded quadrature amplitude modulation (QAM) is about 9 dB, at error rates of the order of $10^{-5}$–$10^{-6}$ (Forney, et al., "Efficient Modulation for Band-limited Channels," IEEE J. Select. Areas Commun., vol. SAC 2, pp. 632–647, 1984, incorporated by reference). Known coded modulation schemes can achieve effective 'coding gains' of the order of 6 dB, largely closing this gap.

Effective coded modulation schemes for the ideal bandlimited Gaussian channel use lattice codes or lattice-type trellis codes, both of which may be considered as coset codes "Coset Codes—Part I: Introduction and Geometrical Classification," IEEE Trans. Inform. Theory, vol. IT-34, Sep., 1988, incorporated by reference. It has been recognized that, with such codes, the coding gain may be separated into two parts, a 'fundamental coding gain' due to the underlying coset code, and a 'shape gain' due to the shape of the signal constellation boundary.

Codes such as Ungerboeck's one-dimensional and two-dimensional lattice type trellis codes (Ungerboeck, "Channel Coding with Multilevel/Phase Signals", *IEEE Transactions on Information Theory*, Vol. IT-28, pp. 55–67, Jan., 1982) or Wei's multidimensional codes (L-F. Wei, "Trellis-coded modulation with multidimensional constellations," IEEE Trans. Inform. Theory, Vol. IT-33, pp. 483–501, 1987, incorporated by reference) can achieve fundamental coding gains of up to 6 dB, or effective coding gains of the order of 5 dB, if the effects of 'error coefficient' are taken into account (Forney, "Coset Codes", supra).

The 'shape gain' measures the improvement due to the shape of the constellation boundary compared to the square boundary which is commonly employed in simple QAM constellations. If shaping results in a spherical signal constellation boundary in higher dimensions, or equivalently in an effective Gaussian distribution in two-dimensions, then shape gains up to a factor of $\pi e/6$ (1.53 dB) can be attained (Forney, et al., supra). On ideal channels, it has been shown that shape gains in excess of 1 dB can be achieved using Voronoi constellations as disclosed in Forney, U.S. patent application Ser. No. 062,497, filed Jun. 12, 1987, and Forney, U.S. patent application Ser. No. 181,203, filed Apr. 13, 1988, or using trellis shaping as disclosed in Forney and Eyuboglu, Trellis Shaping for Modulation Systems, U.S. patent application Ser. No. 312,254, filed Feb. 16, 1989, all incorporated by reference.

In general, coded modulation schemes are designed for ideal channels and practical trellis coded modulation schemes can achieve coding gains of up to the order of 6 dB, thus largely closing the gap to capacity. This coding gain may be viewed as the combination of a fundamental coding gain of the order of 5 dB (effective) and a shape gain of the order of 1 dB.

For non-ideal channels exhibiting non-flat spectra and white noise, linear equalization techniques are conventionally used to create an equalized channel which is as ideal as possible. Linear equalizers are effective if the intersymbol interference (ISI) is not too severe, but when the channel has nulls or near nulls, as is always the case when we wish to use the greatest practical bandwidth on a bandlimited channel, then linear equalization techniques suffer excessive noise enhancement. Similarly, on non-ideal channels with flat response where the noise spectrum is non-flat, linear equalization cannot effectively exploit the correlation in the noise signal. More generally, on channels where the SNR spectrum exhibits large variations within the signal band, a linear equalizer may not perform adequately.

For uncoded systems, two known schemes which can substantially outperform linear equalizers on channels with severly distorted SNR spectra are decision-feedback equalization (DFE) and generalized precoding. A so-called conventional DFE eliminates noise correlation and 'pre-cursor' ISI using a linear filter, and cancels 'post-cursor' ISI using prior decisions. With generalized precoding, sometimes called 'decision feedback in the transmitter', a comparable effect is achieved by a subtraction in the transmitter, using modulo arithmetic. Generalized precoding, unlike DFE, requires knowledge of the channel response in the transmitter, but, also unlike DFE, is not susceptible to error propagation.

It has been shown that at high SNR's the channel capacity can be approached by combining coded modulation schemes designed for ideal channels with ideal (correct feedback) zero-forcing DFE (Price, "Nonlinearly feedback-equalized PAM versus capacity for noisy filter channel," ICC Conf. Record, pp 22-12 to 22-17 1972; and Eyuboglu, "Detection of Severly Distorted Signals Using Decision Feedback Noise Prediction with Interleaving," IEEE Trans. Commun., vol. COM-36, pp. 401–409, Apr., 1988, both incorporated by reference). Indeed, at high SNR's the dB gap between uncoded QAM with DFE and the channel capacity is also 9 dB at error rates of the order of $10^{-5}$–$10^{-6}$. Unfortunately, for coded systems, it is not possible to use DFE directly because decisions made with no delay are unreliable. Several methods for approaching DFE performance with coded systems have been proposed (see U.S. Pat. Nos. 4,631,735, and 4,713,829 issued Mar. 26, 1985 and Jun. 19, 1985, respectively). One of these, reduced-state sequence estimation (RSSE), can approach the performance of maximum likelihood sequence estimation (MLSE), at greatly reduced complexity. The simplest version of RSSE, called parallel decision feedback decoding (PDFD), is closely related to DFE.

Generalized precoding for coded systems is disclosed in our copending U.S. patent application Ser. No. 208,867, entitled Partial Response Channel Signaling Systems, filed Jun. 15, 1988, incorporated by reference. These applications discuss non-ideal partial response channels with responses of the form $h(D) = 1 \pm D^n$. With generalized precoding, for large bits/symbol, essentially the same coding gains (relative to an uncoded system with ideal DFE) can be obtained with the same code and the same decoding complexity over any non-ideal channel as can be obtained over an ideal channel except for the shaping gain, if the channel response is known in the transmitter.

SUMMARY OF THE INVENTION

The present invention, called trellis precoding, combines and extends the generalized precoding and trellis shaping ideas so as to allow the achievement of shaping gains over non-ideal channels of similar magnitude to those obtained over ideal channels—i.e., of the order of 1 dB, with relatively low code complexity.

For a non-ideal discrete-time channel (operating at the signaling rate) with channel response h(D) and white Gaussian noise, trellis precoding involves the use of a reference code $C_s'$ that can be viewed as an ordinary linear trellis code $C_s$ filtered by the formal inverse g(D) of h(D). We observe that such a filtered trellis code cannot in general be represented by a finite-state trellis. Using RSSE concepts, however, we show that $C_s'$ can be decoded with the use of finite-state 'super trellises' in such a way that MLSE performance can be approached with reasonable complexity. In fact, we have found that with the simplest such scheme, parallel decision-feedback decoding (PDFD), where the super-trellis reduces to the ordinary code trellis, and with a simple 4-state two-dimensional Ungerboeck code, shape gains in the range of 0.6 to 0.9 dB can be obtained for a channel response that has two terms.

In general the invention features mapping a digital data sequence into a signal point sequence for data transmission over a channel characterized by a non-ideal response, by selecting the signal point sequence from a subset of all possible signal point sequences based on the digital data sequence and upon the response, all possible signal point sequences in the subset lying in a fundamental region of a filtered trellis code, the fundamental region being other than a simple Cartesian product of finite-dimensional regions.

Preferred embodiments include the following features.

The filtered trellis code is the code whose sequences are c'(D)=c(D)g(D) where g(D) is the formal inverse of a response related to the channel response and c(D) is any code sequence in some ordinary trellis code. The selection step tends to minimize the average power of the signal point sequence e(D)=[x(D)−c(D)] g(D), where x(D) is an initial sequence to which the digital data sequence is initially mapped. x(D) lies in a "simple" fundamental region of the ordinary trellis code and the "simple" fundamental region of the ordinary trellis code is a simple Cartesian product of finite dimensional regions.

The selection is based on reduced state sequence estimation with respect to the filtered trellis code, using no more states than the number of states of the ordinary trellis code.

The fundamental region of the filtered trellis code comprises approximately a Voronoi region of the filtered trellis code, in particular the set of possible signal point sequences that are decoded to the zero sequence in the filtered trellis code by some decoder for the code, e.g., by an approximation to a minimum distance decoder with delay M, wherein M is greater than or equal to 1.

The digital data sequence is recovered from a possibly noise-corrupted version of the signal point sequence by decoding the signal point sequence to a sequence of estimated digital elements and forming a syndrome of fewer digital elements based on a portion of the estimated digital elements using a feedback-free syndrome former $H^T$.

The initial sequences are code sequences from a translate of a second code, the second code being of the trellis or lattice type.

The digital data sequence is mapped into an initial sequence belonging to and representing a congruence class of the ordinary trellis code, a signal point sequence belonging to a congruence class of the filtered trellis code is chosen which has no greater average power than the initial sequence, and a portion of the elements of the digital data sequence are applied to a coset representative generator for forming a larger number of digital elements representing a coset representative sequence. The coset representative generator performs a multiplication of a portion of the elements of the digital data sequence by a coset representative generator matrix $(H^{-1})^T$ which is inverse to a syndrome-former matrix $H^T$ for the code.

The trellis code may be a linear or a non-linear trellis code. The linear trellis code is a 4-state Ungerboeck code. The trellis code may be based on a partition of binary lattices or ternary or quaternary lattices.

The mapping of data elements to points in an initial constellation is linear or distance invariant. The selection of the signal point sequence is further constrained to reduce the peak power of the signal point sequence where the peak power represents the maximum energy of the signal point sequence in some number of dimensions N (e.g., N=2 or N=4). The selection is constrained so that the sequence will usually be within some sphere of radius $R_c$.

The reduced state sequence estimation comprises a step wherein, in each recursion, there is an operation that will assure that the sequence is an allowable sequence, namely adjusting the metrics of selected paths in the trellis of the reduced state sequence estimator, so that none of the selected paths will become the most likely path in the next recursion. The paths are chosen based on whether they include particular state transitions at particular locations in the trellis. The operation comprises assigning a large metric to the selected paths in the trellis. The step of mapping the digital data sequence into the signal point sequence is arranged to ensure that the digital data sequence can be recovered from a channel-affected version of the signal point sequence which has been subjected to one of a number of predetermined phase rotations. The step of mapping the digital data sequence into a sequence of signal points belonging to an initial constellation includes converting the data elements in the data sequence into groups of bits for selecting signal points from the initial constellation, and the groups of bits are arranged to ensure that the bits can be recovered from a channel affected version of the transmitted sequence which has been subjected to phase rotations of one, two, or three times 90 degrees.

Another general feature of the invention is a modem for transmitting and receiving digital data sequences via a channel comprising means for mapping a digital data sequence into a signal point sequence for data transmission over a channel characterized by a non-ideal response, including a sequence selector for selecting the signal point sequence from a subset of all possible signal point sequences based on the digital data sequence and upon the response, all possible signal point sequences in the subset lying in a fundamental region of a filtered trellis code, the fundamental region being other than a simple Cartesian product of finite-dimensional regions, a modulator for sending the signal points of the sequence via the channel, a demodulator for receiving a possibly channel-affected version of the signal point sequence from the channel, and means for recovering a digital data sequence from the possibly channel-affected version of the signal point sequence.

In preferred embodiments, the means for recovering comprises an adaptive linear equalizer, an adaptive prediction filter, and a decoder, and wherein during training the prediction filter h(D) is learned after the linear equalizer and, during data transmission, the prediction filter is kept fixed, and further comprising a g(D) element through which the final prediction error formed at the output of the prediction filter is passed in order to reconstruct the equalizer error.

Other advantages and features will become apparent from the following description of the preferred embodiment, and from the claims.

DESCRIPTION OF THE PREFERRED EMBODIMENT

We first briefly describe the drawings.

FIG. 6 is a general block diagram of a transmitter and a receiver used in precoding.

FIG. 7 is a block diagram of a transmitter.

FIG. 8 is a block diagram of a receiver.

TERMINOLOGY AND PRINCIPLES

Figure 1:
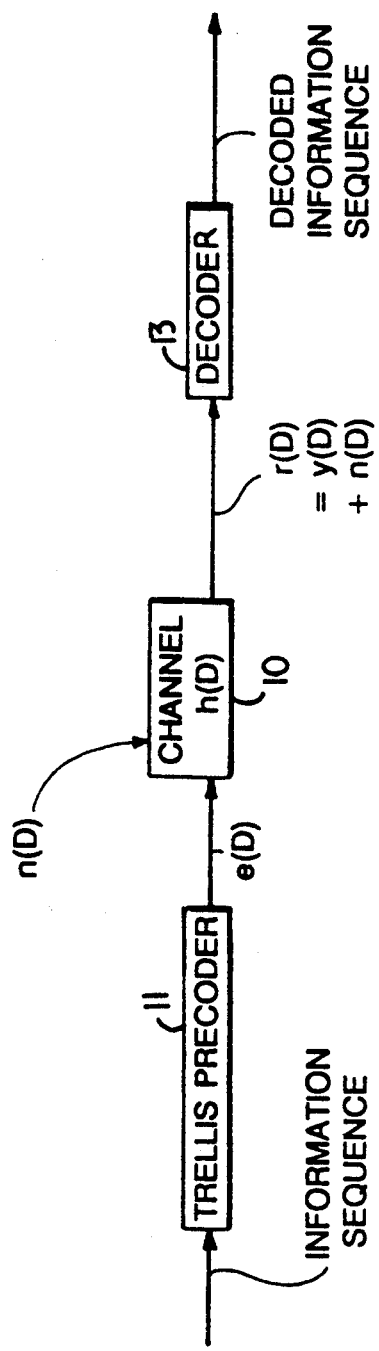
FIG. 1 is a block diagram of a channel model.

We first discuss terminology and principles which underlie the invention.

Sequences

A sequence of elements from an alphabet A is denoted as $(a_0, a_1, \ldots)$; or as $\{a_k, k \geq 0\}$; or as the formal power series $a(D) = a_0 + a_1 D + \ldots$ expressed in the delay operator D. The set of all sequences of elements of A (sequence space) is denoted as $A^\infty$.

Lattices

An N-dimensional real lattice $\Lambda$ is a discrete set of N-tuples in real Euclidean N-space $R^N$ that forms a group under ordinary vector addition. For example, the set $Z^N$ of all N-tuples with integer coordinates is a lattice.

A subgroup of $\Lambda$ is called a sublattice. A sublattice $\Lambda'$ induces a partition $\Lambda/\Lambda'$ of $\Lambda$ into $|\Lambda/\Lambda'|$ cosets of $\Lambda'$ in $\Lambda$.

Since we will be dealing primarily with complex signals, it will in principle be preferable to regard a real N-dimensional lattice $\Lambda_r$ as a complex (N/2)-dimensional lattice $\Lambda_c$, with elements in complex Euclidean (N/2) space $C^{N/2}$, by identifying the coordinates of $\Lambda$ with the real and imaginary parts of the coordinates of $\Lambda_c$. For example, the two-dimensional real lattice $Z^2$ corresponds to a one-dimensional complex lattice called G, the lattice (ring) of complex Gaussian integers.

A lattice code is simply the set $\Lambda^\infty$ of all sequences of elements of some lattice $\Lambda$.

Lattice-Type Trellis Codes

A binary lattice-type trellis code is denoted by $C(\Lambda/\Lambda'; C)$, where $\Lambda/\Lambda'$ is a partition of (binary) lattices of order $|\Lambda/\Lambda'| = 2^{k+r}$, and C is a rate $k/(k+r)$ binary convolutional code with $S = 2^v$ states, where $v$ is the code constraint length. A binary lattice is a sublattice of the N-dimensional lattice $Z^N$ of integer N-tuples that has $2^n Z^N$ as a sublattice.) The codewords of the convolutional encoder for code $\underline{C}$ specify a sequence of cosets of $\Lambda$ according to some coset labeling. The code sequences c(D) in $\underline{C}$ are those sequences in $\Lambda$ that belong to sequences of cosets of $\Lambda$ that could possibly be selected by some codeword in C. All c(D) in $\underline{C}$ can be represented in a compact fashion by a trellis diagram of C, with branches whose (k+r)-bit labels represent the cosets of $\Lambda'$.

The time-zero lattice $\Lambda_0$ of $\underline{C}$ is defined as the union of the $2^k$ cosets of $\Lambda$ that correspond to the $2^k$ trellis branches that extend from the zero state.

A lattice code $\Lambda^\infty$ may be regarded as a degenerate trellis code in which $\Lambda' = \Lambda$.

Linear Trellis Codes

A trellis code $\underline{C}$ is linear if the sum of any two code sequences in c(D) is another code sequence. A simple example of a linear trellis code is a lattice code $\Lambda^\infty$. However, the more important examples are the so called 'mod-2' trellis codes. Such trellis codes may be regarded as codes $\underline{C}(Z^N/2Z^N; C)$ based on the N-dimensional $2^N$-way lattice partition $Z^N/2Z^N$ and on some rate k/N binary convolutional code C, and may be characterized as the set of all integer N-tuple sequences that are congruent (mod 2) to binary N-tuple sequences in C (Forney, Coset Codes-I, supra). Important mod-2 trellis codes include the 4-state 2-dimensional Ungerboeck code, and the multidimensional Wei and dual Wei codes.

If $\underline{C}$ is a linear trellis code, we say that two sequences a(D) and b(D) are congruent modulo $\underline{C}$ if their difference a(D)−b(D) is a code sequence c(D) in $\underline{C}$.

An exhaustive decoder of a trellis code $\underline{C}$ is any map c(r) from arbitrary sequences r(D) in sequence space $(R^N)^\infty$ to sequences c(D) in $\underline{C}$. The decision region R(c) associated with any particular code sequence c(D) is the set of all r(D) that map to c(D). The apparent error, or simply error, associated with r(D) is then $e(r) = r(D) - c(r)$, and the error region associated with $c(D)$ is then $\underline{R}_e(c) = \underline{R}(c) - c(D)$. The set of all decision regions $\underline{R}(c)$ for all $c(D)$ in $\underline{C}$ forms an exhaustive partition of sequence space $(R^N)^\infty$.

A fair, exhaustive decoder of a linear trellis code $\underline{C}$ is a map such that if $r(D)$ maps to $c(D)$, then $r(D) + c'(D)$ maps to $c(D) + c'(D)$ for all $c'(D)$ in $\underline{C}$. It follows that if the decision region corresponding to the code sequence 0 is $\underline{R}(0)$, then the decision region corresponding to any code sequence $c(D)$ is $\underline{R}(c) = \underline{R}(0) + c(D)$, and there is a common error region $\underline{R}_e(c) = \underline{R}_e(0) = \underline{R}(0)$ for all $c(D)$ in $\underline{C}$. Thus there is an exhaustive partition of sequence space $(R^N)^\infty$ consisting of the translates $\underline{R}(0) + c(D)$, of the common error region $\underline{R}(0)$ for all $c(D)$ in $\underline{C}$.

If $\underline{C}$ is a linear trellis code, two sequences in $(R^N)^\infty$ will be said to be congruent mod $\underline{C}$ if their difference is an element of $\underline{C}$. Since $\underline{C}$ is a group under sequence addition, congruence mod $\underline{C}$ is an equivalence relation and partitions sequence space $(R^N)^\infty$ into equivalence (congruence) classes. A fundamental region $\underline{R}(\underline{C})$ of a linear trellis code $\underline{C}$ is then a set of sequences that includes one and only one sequence from each congruence class mod $\underline{C}$. Then every sequence $r(D)$ in $(R^N)^\infty$ can be uniquely expressed as a sum $r(D) = c(D) + e(D)$ for some $c(D)$ in $\underline{C}$ and $e(D)$ in $\underline{R}(\underline{C})$; i.e., there is a coset decomposition which may be written as $(R^N)^\infty = \underline{C} + \underline{R}(\underline{C})$. Clearly, $\underline{R}(\underline{C})$ is a fundamental region of a linear trellis code $\underline{C}$ if and only if it is the common error region $\underline{R}(0)$ of a fair, exhaustive decoder for $\underline{C}$. Thus we may specify fundamental regions by specifying appropriate decoders.

Trellis Precoding

Referring to FIG. 1, in what follows, initially we shall assume a discrete-time channel 10 operating at the baud rate $1/T$ between the output of a trellis precoder 11 in the transmitter and the input of a decoder 13 in the receiver. Referring to FIG. 1, this channel 10 is characterized by a causal, complex impulse response $h(D) = h_0 + h_1 D + h_2 D \ldots$, whose terms $h_j$ are complex, and by a discrete-time complex white Gaussian noise sequence $n(D)$ such that $E[|n_k|^2] = N_0$. Without loss of generality we set $h_0 = 1$. If $e(D)$ is a complex input sequence to the channel, then the received sequence is $r(D) = y(D) + n(D)$, where $y(D) = e(D)h(D)$ is the noise-free part of the received sequence. This channel model is canonical in the sense that any continuous-time or discrete-time linear Gaussian channel can be reduced to this form without loss of information. How this can be accomplished in practice will be explained later on.

Figure 2:
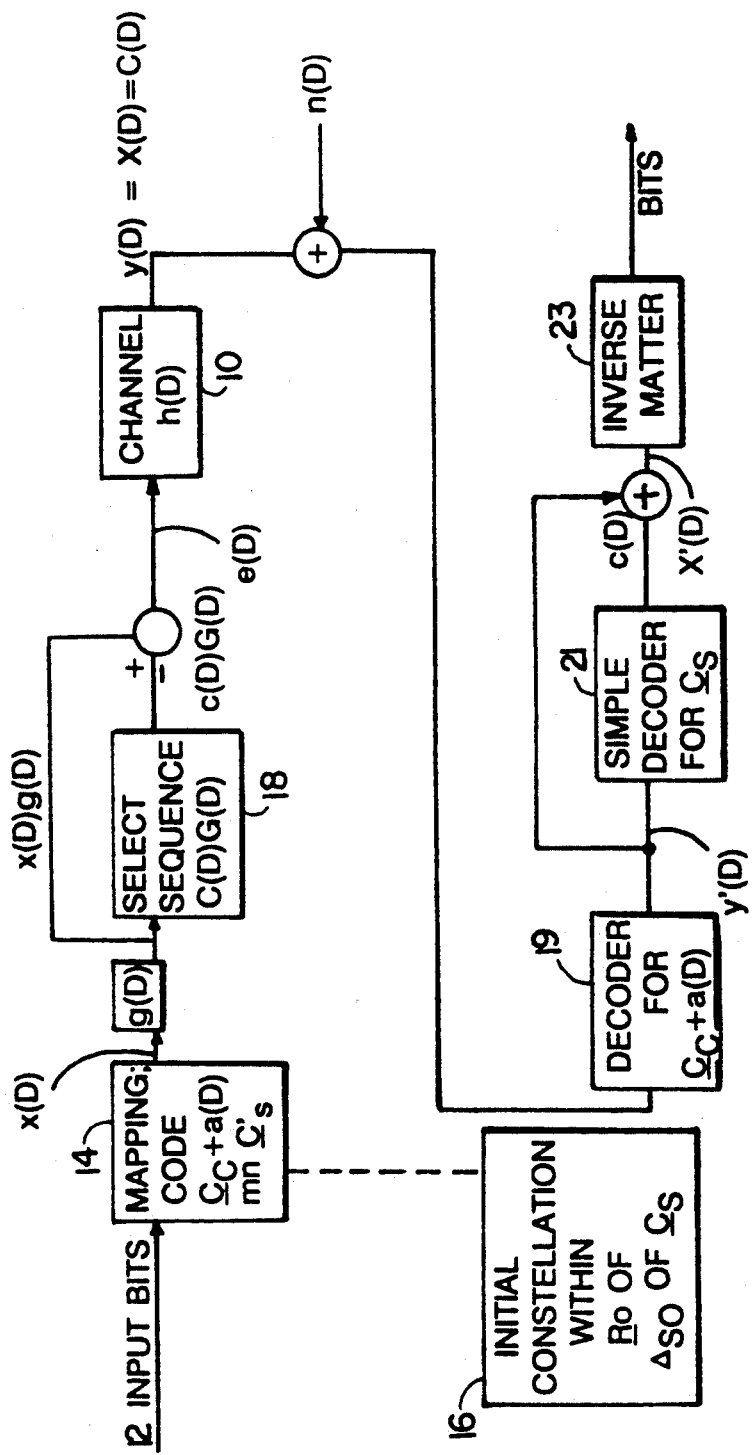
FIG. 2 is a block diagram of a trellis precoding scheme.

In summary, referring to FIG. 2, trellis precoding operates as follows. First, input bits 12 to be sent on the channel are mapped (14) to an initial signal point sequence $x(D)$ according to some known signalling scheme, e.g., uncoded QAM, or some known coded modulation scheme. That is, $x(D)$ is a sequence in a translate $\underline{C}_c + a(D)$ of some known code $\underline{C}_c$, which could be simply a lattice code $\Lambda^\infty$—e.g., $(Z^2)^\infty$ for ordinary QAM. The initial constellation 16 (set of all possible signal points from which the signal point sequence $x(D)$ is drawn) is constrained to lie within some fundamental region $R_o$ of the time zero lattice $\Lambda_{s0}$ of some second trellis code $\underline{C}_s$, so $x(D) \in (R_0)^\infty$.

Returning to FIG. 2, initially, we shall require that $\underline{C}_s$ be a linear trellis code. Also, $\underline{C}_s$ must be a subcode of $\underline{C}_c$; that is, any code sequence in $\underline{C}_s$ is also in $\underline{C}_c$.

Second, a code sequence $c(D)$ in $\underline{C}_s$ is selected (18) in a trellis procoder so as to try to minimize the average power of $$e(D) = [x(D) - c(D)]g(D),$$

where $g(D)$ is the formal inverse $1/h(D)$ of the channel response $h(D)$.

A useful way of expressing the key step in trellis precoding is as follows. Let $x'(D) = x(D)g(D)$. Then we seek a $c'(D)$ that minimizes $||e(D)||^2 = ||x'(D) - c'(D)||^2$, where $c'(D)$ is any sequence of the form $c(D)g(D)$, $c(D) \in \underline{C}_s$. We call the set of all such $c'(D)$ the filtered trellis code $\underline{C}_s' = \underline{C}_s g(D)$. Note that if $x(D)$ is a random sequence uniformly distributed in some fundamental region $\underline{R}_0$ of $\underline{C}_s$, then $x'(D)$ is uniformly distributed in a fundamental region $\underline{R}_0$ of $\underline{C}_s'$. This follows from the fact that $V(\underline{R}_0) = V(\underline{R}'_0)$ [where $V(\underline{R})$, the volume of a fundamental region is the volume of N-space associated with each lattice point] and that the transformation $x'(D) = x(D)g(D)$ is one-to-one. Furthermore, it follows that $e(D)$ is uniformly distributed in the Voronoi region $\underline{R}_V(\underline{C}'_s)$ of $\underline{C}'_s$. (The Voronoi region of a code is the set of possible signal point sequences that are decoded to the zero sequence in the code by a minimum distance decoder.) Thus, the average power $P_{avg}$ of $e(D)$ is the average power of the sequences in $\underline{R}_V(\underline{C}'_s)$. Note that $P_{avg}$ will, in general, depend on the interaction between the code $\underline{C}_s$ and $|G(w)|$, the magnitude response of $g(D)$, but it is independent of the phase response of $g(D)$. It can also be shown experimentally that $e(D)$ will be an uncorrelated sequence (i.e., it has a flat spectrum.)

The received sequence is given by $$r(D) = e(D)h(D) + n(D) = x(D) - c(D) + n(D) = y(D) + n(D).$$

where $y(D)$ is congruent modulo $\underline{C}_s$ to $x(D)$. Consequently, since $\underline{C}_s$ is a linear subcode of $\underline{C}_c$, then $y(D) = x(D) - c(D)$ is also (like $x(D)$) a sequence in the translate $\underline{C}_c + a(D)$ of $\underline{C}_c$, and $d_{min}^2(Y) \geq d_{min}^2(\underline{C}_c)$. A decoder 19 for $\underline{C}_c$ can be used to detect $y(D)$ and will achieve effectively the same performance (i.e., $d_{min}^2(\underline{C}_c)$) as when $x(D)$ is transmitted over an ideal channel with noise $n(D)$. Finally, $x(D)$ is the unique sequence in $(R_0)^\infty$ that is congruent mod $\underline{C}_s$ to $y(D)$, and so can be recovered from the estimated $\bar{y}(D)$ by a simple decoder 21 for $\underline{C}_s$ whose common error region is $(R_0)^\infty$ namely a symbol-by-symbol 'mod $\Lambda_{s0}$' operation. (Note that if the decision region of the decoder corresponding to the code sequence 0 in $\underline{C}_s$ is $\underline{R}(0)$, then the decision region corresponding to any code sequence $c(D)$ in $\underline{C}_s$ is $\underline{R}(c) = \underline{R}(0) + c(D)$ and there is a common error region $\underline{R}_e(c) = \underline{R}_e(0) = \underline{R}(0)$ for all $c(D)$ in $\underline{C}_s$.) The input bits can then be retrieved by an inverse mapper 23 which converts the estimated $x(D)$ back to the information sequence.

The performance of trellis precoding will be measured by the ratio $\gamma = d_{min}^2/(P_{avg} N_0)$.

Filtered Trellis Codes

As mentioned, in trellis precoding we seek a $c'(D)$ that minimizes $||e(D)||^2 = ||x'(D) - c'(D)||^2$, where $c'(D)$ is any sequence of the form $c(D)g(D)c(D) \in \underline{C}_s$. We call the set of all such $c'(D)$ the filtered trellis code $\underline{C}_s' = \underline{C}_s g$. To implement trellis precoding, we need a minimum mean-squared error (MMSE) decoder for $\underline{C}_s'$.

Clearly, $\underline{C}_s'$ is a linear code, since $\underline{C}_s$ is linear. Even if $\underline{C}_s$ can be represented by a finite-state trellis, however, $\underline{C}_s'$ in general cannot. Indeed, if $s_k$ is the state of an encoder that generates a code sequence $c(D) \in \underline{C}_s$ at time k, then the state of the sequence $c'(D)=c(D)g(D)$ at time K is $s_k'=[s_k;p_k]$, where $p_k=[c_{k-1}, c_{k-2}, \ldots]$ represents the state of the 'channel' whose response is $g(D)$. The number of possible values of $p_k$ is not finite, even if $g(D)$ has finite degree, because the set of possible code symbols $c_{k-i}$, $i=1,2,\ldots$, is a coset of a lattice and thus has infinitely many elements. Therefore, in general, a MMSE decoder for $\underline{C}_s'$ can be realized only by a tree (not trellis) search over all possible code sequences $c(D)$ or $c(D)$, which is not feasible.

Reduced-State Decoders for Filtered Two-Dimensional Trellis Codes

In what follows, we will further restrict $h(D)$ to have a minimum-phase response; i.e., all poles and zeros of $h(D)$ are constrained to lie inside or on the unit circle. This is not an operational requirement; however it improves performance when suboptimum decoders are employed.

We now show how to construct a class of near-optimum 'reduced-state' trellis decoders for $\underline{C}_s'$, using reduced-state sequence estimation (RSSE) principles.

In this section, we shall assume that $\underline{C}_s$ is a two-dimensional trellis code based on the partition $\Lambda_s/\Lambda_s'=Z^2/R^{m+r}Z^2$; these codes can be represented by trellises that have $2^m$ transitions per branch where each branch is associated with a unique coset of $R^{m+r}Z^2$. In the next section, we will show how the method may be extended to higher dimensional trellis codes. It will be apparent that two-dimensional codes are the most natural ones to use when $g(D)$ is a complex-valued response.

Two relevant principles of reduced-state sequence estimation are, first, to keep track only of the last K code symbols $c_{k-i}, 1\leq i\leq K$, even when the filter response $g(D)$ has degree greater than K, and second, to keep track of $c_{k-i}$ only with respect to its membership in one of $|\Lambda_s/\Lambda(i)|$ cosets $\Lambda(i)+a(c_{k-i})$ of some lattice $\Lambda(i)$ where the sequence of lattices $\Lambda(1), \Lambda(2), \ldots, \Lambda(K)$ is nested (i.e., $\Lambda(i)$ must be a sublattice of $\Lambda(i+1)$, $1\leq i\leq K-1$) so that as a code symbol $c_{k-i}$ becomes less recent, the information that is kept about it becomes coarser and coarser, until it is forgotten altogether (at $i=K$).

Thus if $\Lambda_s$ and $\Lambda_s'$ are two-dimensional real (one-dimensional complex) lattices, e.g., $\Lambda_s=Z^2$ and $\Lambda_s'=R^{m+r}Z^2$, we define a two-dimensional partition chain $Z^2/\Lambda(K)/\ldots/\Lambda(1)$, where $\Lambda(i)=R^i Z^2, 1\leq i\leq K$, so that $Z^2/\Lambda(i)$ is a two-dimensional lattice partition of order $J_i=2^i$.

A code symbol $c_{k-i}, 1\leq i\leq K$, in $Z^2$ belongs to one of $J_i$ cosets of $\Lambda(i)$. We denote this coset by $a(c_{k-i})$ Then, the 'coset state' of a code sequence $c'(D)=c(D)g(D)$ at time k can be defined as $t_k=[a(c_{k-1}), \ldots, a(c_{k-K})]$.

Next we concatenate coset states $t_k$ with encoder states $s_k$ to obtain 'super states' $v_k$:

$$v_k=[s_k;t_k]=[s_k;a(c_{k-1}), \ldots, a(c_{k-K})].$$

Note that given the current state $v_k$ and the code symbol $c_k$, the next state $v_{k+1}$ is uniquely determined. The uniqueness is guaranteed by the nested nature of the partitions, i.e., by the fact that $\Lambda(i)$ is always a sublattice of $\Lambda(i+1)$.

Figure 3:
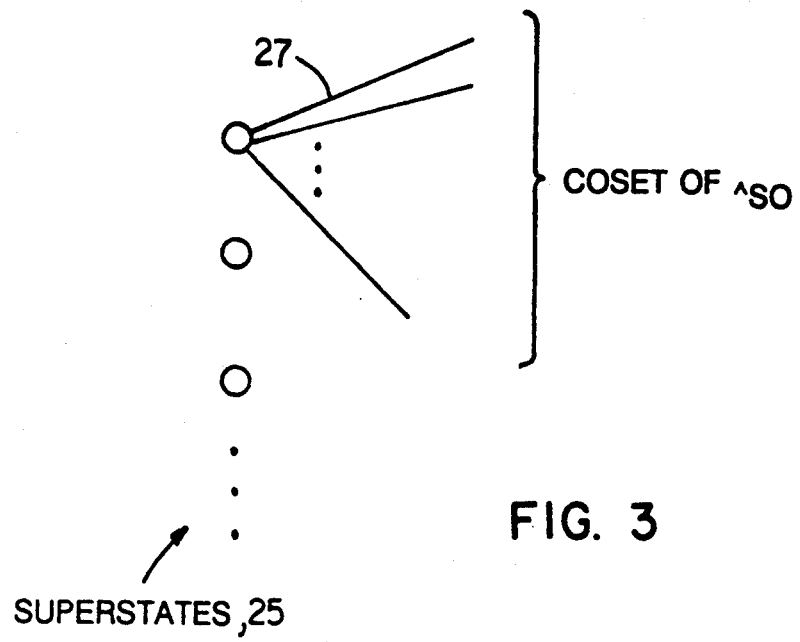
FIG. 3 is a reduced state trellis.

Referring to FIG. 3, the super-states define a reduced-state trellis, which we sometimes call a super-trellis. In this trellis, signal points associated with all branches 27 leaving a super-state 25 belong to a coset of the time-zero lattice $\Lambda_{s0}$. If $\Lambda_s'$ is a sublattice of $\Lambda(1)$, then as in the ordinary trellis there are $2^m$ branches leaving any super-state, each associated with one of the $2^m$ cosets of $\Lambda'$ whose union is the given coset of $\Lambda_{s0}$. If $\Lambda(1)$ is a sublattice of $\Lambda_s'$, on the other hand, then there is a branch for each of the $2^{j_1-r}$ cosets of $\Lambda(1)$ whose union is the given coset of $\Lambda_{s0}$.

The number of possible values that $v_k$ can take is finite. In fact, if $\Lambda(i)$ is a sublattice of $\Lambda_s' (j_i \leq m+r)$ for all $i<K$, and $\Lambda(K)$ is a sublattice of $\Lambda_{s0} (j_K\geq r)$, then the total number of super-states is given by $$S'=S\pi_{1\leq i\leq K}2^{j-r}.$$

Having described the reduced-state trellis, we now show how the Viterbi algorithm is used to search these trellises. Let $g(D)=g_K(D)+g_\infty(D)$, where $g_K(D)=1+g_1D+\ldots+g_KD^K$ is the polynomial corresponding to the first $K+1$ terms of $g(D)$, and $g_\infty(D)$ is a residual component of possibly infinite span. Let $g_\infty(D)=g_N(D)/g_D(D)$, where $g_N(D)$ and $g_D(D)$ are both finite-order polynomials. Then $g_N(D)$ has the same delay as $g_\infty(D)$, whose delay is at least $K+1$.

Figure 4:
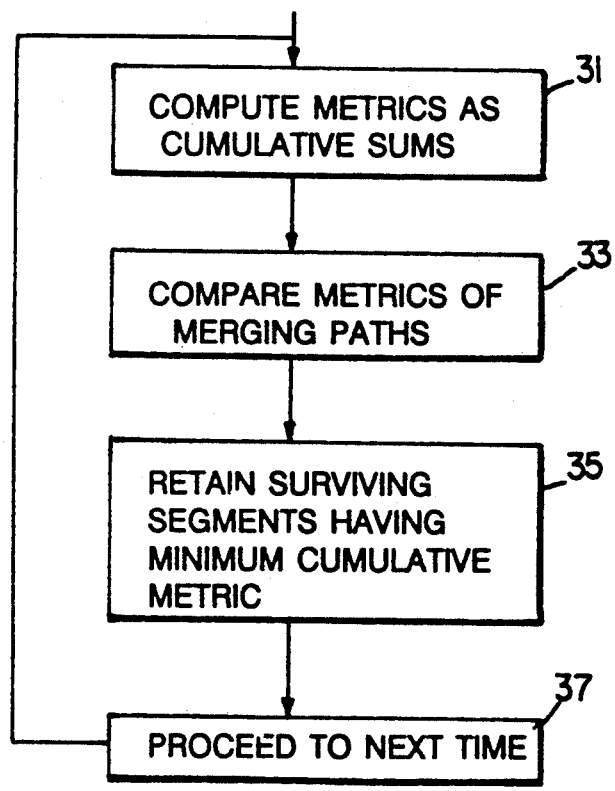
FIG. 4 is a diagram of the steps of a Viterbi algorithm.

Suppose that the input to the reduced state decoder is $x'(D)$. Referring to FIG. 4, let us define the Euclidean distance path metric of a code sequence $c'(D)$ at a given time k as the cumulative sum $$\Gamma_k=\Sigma_{j\leq k}\gamma_j$$

of the branch metrics $\gamma_j$, $j\leq k$, computed (31) according to $$\gamma(D)=\|x'(D)-c'(D)\|^2=\|x(D)+[x(D)-c(D)][g_K(D)-1]+w(D)-c(D)\|^2$$

where $w(D)=[x(D)-c(D)]g_\infty(D)$, which means that $w(D)$ satisfies $$w(D)=-w(D)[g_D(D)-1]+[x(D)-c(D)]g_N(D),$$

with $w_k=0$, for $k\leq 0$. Note that $[g_K(D)-1]$, $g_N(D)$, and $[1-g_D(D)]$ all have a delay of at least 1; therefore, the Viterbi algorithm (VA) can proceed in a recursive manner 37 by comparing metrics (33) of merging paths and retaining 35 the surviving sequences with minimum path metrics. Of course, in contrast to the operation of the VA in maximum likelihood sequence estimation (MLSE), where branch metrics are independent of the surviving path, here these depend on the surviving paths through $c_{k-1}, \ldots, c_{k-K}$, and $w_k$. Therefore, the VA needs to store these quantities for every surviving path. It should be noted that even though only K terms of the filter response $g(D)$ are taken into account in the trellis construction, its entire memory is included in the branch metric computations.

Among these reduced-state decoders, there is one that particularly stands out in terms of its tradeoff of performance against complexity. This is the special case of parallel decision-feedback decoding (PDFD), where the reduced-state trellis is simply the trellis of the original code $\underline{C}_s$. This is obtained by setting $K=0$. The PDFD decoder is the simplest in this class, and its performance is the poorest, although it often performs close to the optimum decoder.

A practical VA has a finite decoding delay M. We can assume that it effectively makes a decision on the kth symbol $c_k$ based on observations $r_k, r_{k+1}, \ldots, r_{k+M}$, assuming the correct node at time k is $v_k$. (Under this assumption the VA will always select a true code sequence.) For M=0, such a decoder becomes a simple decision-feedback decoder (DFD), where in every symbol interval the decoder subtracts the 'post-cursor' ISI using past decisions, and then operates like a hard decision decoder by selecting the closest signal point $c_k$ in an appropriate coset of $\Lambda_{s0}$ using a MMSE decoder for $\Lambda_{s0}$. Clearly in this case, regardless of the channel response, the error sequence will always lie in $[R_V(\Lambda_{s0})]^\infty$, where $R_V(\Lambda_{s0})$ is the Voronoi region of the time-zero lattice $\Lambda_{s0}$, and the average power of this region will determine the average power of the transmitted symbols.

The common error region of an RSSE decoder is a fundamental region of $\underline{C}'_s$. The average power of this region will determine the shape gain that can be achieved. This region, and thus the shape gain will generally depend on the interaction between the original code $\underline{C}_s$ and the filter g(D), as we have seen with MMSE decoders.

In practice, we can measure the shape gain of an error region as follows. We take an input sequence x'(D), which is uniformly distributed in some simple fundamental region $(\underline{R}_0)^\infty$ of $\underline{C}_s'$. We decode it and obtain an error sequence e(D). This sequence will be uniformly distributed in the common error region of the decoder. The output mean-squared error (MSE) gives the shape gain. For M=0, we get the shape gain of $\Lambda_{s0}$. As M is increased towards infinity, the error region will change and the output MSE will monotonically decrease towards a limit which depends on the reduced-state trellis being used.

Reduced-State Decoders for Filtered Multidimensional Trellis Codes

We now extend these reduced-state decoding methods to higher-dimensional (N>2) linear trellis codes $\underline{C}_s$, such as the dual Wei codes. The dual Wei codes are duals of the Wei codes of the kind disclosed in Wei, "Trellis Coded Modulation with Multidimensional Constellations," IEEE Trans. Inform. Theory, Vol. IT-33, pp. 483-501, 1987, incorporated herein by reference. These codes are 'mod 2' trellis codes, which can always be regarded as being based upon the lattice partition $\Lambda_s/\Lambda_s' = Z^N/2Z^N$, and on some rate-k/N binary convolutional code $\underline{C}$ that selects cosets of $2Z^N$ in $Z^N$. These cosets can be specified by N/2 cosets of $2Z^2$ in $Z^2$.

It follows that the N-dimensional trellis code can be represented by a two dimensional trellis, which is periodically time-varying with period N/2. At times nN/2, the trellis has S states and $2^m$ branches per state as in the original N-dimensional trellis, whereas at intermediate times (kN/2)+j, j=1, 2, ..., (N/2−1), the number of states may be larger, where the exact number of states depends on the specific code in use.

Figure 5:
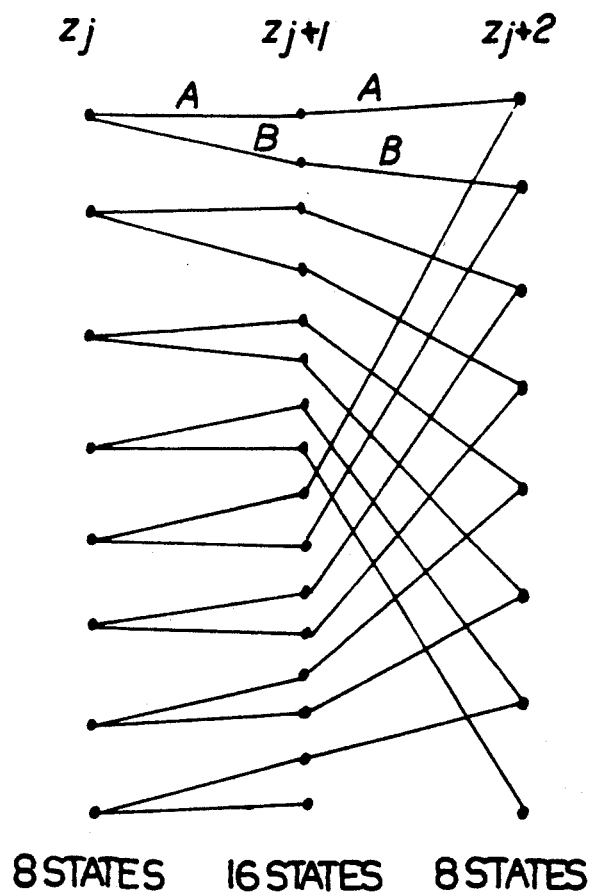
FIG. 5 is a trellis for a Wei code.

As an example, consider the 4D 8-state dual Wei code, which can be viewed as a period 2, time-varying trellis code based on the partition $Z^4/2Z^4$ and a rate-$\frac{1}{4}$ convolutional encoder. This trellis is illustrated in FIG. 5. Note that there are 8 states at even times, with 2 distinct branches leaving each state, and there are 16 states at odd times, with one branch leaving each state.

Once a two-dimensional trellis is obtained, reduced-state decoders can be defined as in the previous section. The operation of the VA is then similar, except it has to account for the time-varying nature of the trellis. Also, the shape gain of a hard-decision decoder (M=N/2−1) may not be the same as that of the time-zero lattice $\Lambda_{s0}$.

Construction of the Discrete-Time Channel Model

So far, we have assumed a canonical discrete-time channel model described by $$r(D) = e(D)h(D) + w(D)$$

where e(D) is a complex input sequence, h(D) is a complex, causal, minimum-phase response with $h_0=1$ and w(D) is a white Gaussian noise component which is independent of e(D). In practice, the physical channel will rarely obey this canonical model; the channel response is often nonminimum-phase, the noise can be correlated and, furthermore, the physical channel is often continuous-time. Therefore, referring to FIG. 6, in practice, the physical channel 201 is often augmented by linear transmitter and receiver filters 202, 204 in the transmitter and in the receiver to construct a discrete-time channel 205 that obeys the canonical model.

In addition to providing the canonical discrete-time channel, it is desirable that these filters also help optimize the performance of the trellis precoder. It has been shown in the case of generalized precoding that the optimum transmitter filter has a brickwall (or flat) spectrum within the Nyquist band (for continuous-time channels this result holds under certain mild conditions (Price, supra)); the optimum receiver filter, on the other hand, consists of a matched filter (matched to the channel response and the noise spectrum of the physical channel) sampled at the baud rate (and at the optimum sampling phase), followed by a discrete time noise whitening filter that produces a minimum-phase combined response h(D) (Price, supra). This noise whitening filter can be described by the cascade of a zero-forcing linear equalizer and a minimum-phase linear prediction (error) filter for the residual noise sequence appearing at the output of the linear equalizer. The prediction filter represents the channel model h(D).

In practice, it may sometimes be preferable to allow the overall discrete time channel to deviate from the canonical model to arrive at a better trade-off between ISI and noise. For example, the selection of the filter may be based on the output MSE. Of course, due to the presence of ISI, minimum MSE does not guarantee minimum error probability. Nevertheless, this criterion is often used in practice because of ease in adaptive implementation, and because it is believed that often (if not always) it leads to lower error probability, particularly at low SNR. Under the MSE criterion, the optimum transmitter spectrum is different; it has the 'water-pouring characteristic' found in information theory (J. Salz, "Optimum mean-squared error decision feedback equalization," BSTJ, vol. 52, pp. 1341-1373, 1973). For the moderate or high SNR's found on telephone lines, however, a 'water pouring spectrum' can be closely approximated by a brickwall spectrum. The minimum MSE receiver filter also consists of a matched filter sampled at the baud rate and a discrete time filter that produces a white residual error sequence. The whitening filter can now be represented by the cascade of a MSE linear equalizer and a prediction error filter for the error sequence (ISI+noise) that appears at the output of that equalizer.

Under the MSE criterion, the received sequence can be written as $r(D)=e(D)h(D)+n'(D)$, where the error sequence $n'(D)$ is now signal-dependent and possibly non-Gaussian; the trellis precoder can still operate in the same manner. Here, it may be helpful to note that with an optimum transmitter filter, the overall response $h(D)$ is independent of the SNR (in fact, it is the same filter that we obtain under the no ISI criterion.)

In practice, the combination of the matched filter and the MSE linear equalizer can be implemented as a digital transversal equalizer with a fractional tap-spacing of T/M, where T is the baud interval and M is chosen sufficiently large to avoid aliasing. Since the characteristics of the physical channel is often unknown an adaptive training algorithm is needed to learn this equalizer. This can be accomplished by transmitting a known training sequence such as a pseudo-noise (PN) sequence modulating a QPSK signal structure prior to data transmission, and then using a least-mean square (LMS) algorithm (J. Proakis, "Digital Communications," McGraw Hill, 1983). Once the equalizer is learned, an adaptive minimum MSE linear predictor can be realized. This predictor has a tap-spacing of T and it whitens the residual error sequence. Its steady-state coefficients form the desired channel response $h(D)$ of the model. So far, we have implicitly assumed that all filters are infinitely long. Of course, in practice, the linear equalizer and the predictor are implemented with finite length filters; nevertheless, when these are sufficiently long the general discussion presented above will approximately apply.

After a sufficiently long training period, the information about $h(D)$ is passed back to the transmitter for use during trellis precoding. During data transmission an adaptive algorithm may continue to adjust the coefficients of the linear equalizer to track small variations in the channel response. However, the prediction filter is kept fixed. It is conceivable to update the predictor as well, provided that this information can be relayed back to the transmitter using a 'service channel' and proper synchronization between the transmitter and the receiver can be maintained. Alternatively, the receiver may monitor the true current values of the prediction filter coefficients and may request a new training signal if the discrepancy becomes excessive.

Modem Implementation

One application of trellis precoding is to a voiceband modem operating at a baud rate of 2954 Hz and a bit rate of 19.2 kb/s, thus sending 6.5 bits/baud. The transmitter and the receiver are implemented mostly in digital form.

The transmitter 102 and the receiver 104 of such a modem are shown respectively in FIGS. 7, 8. Based on the optimality discussion above, the transmitter filter 106 is chosen to have a square-root-of-raised-cosine characteristics with a small excess bandwidth ($\leq 12\%$), thus approximating a brickwall spectrum. During training, a known pseudo-random four-point QAM sequence 107 $x(D)$ is transmitted via train/data switch 105 for a sufficiently long period of time to allow the receiver to learn first its adaptive equalizer 108 and subsequently its adaptive prediction filter 110. The complex output of the transmitter filter is modulated to a carrier frequency $w_c$ (radians/s) and the real part of the modulated signal is D/A converted, filtered by an analog filter, and transmitted over the channel, all by unit 107. In the receiver 104, the received signal is filtered by an analog filter 109 and then A/D converted at a sufficiently high nominal sampling rate M/T (the sampling phase is controlled by a timing recovery circuitry). The sequence of digital samples $z_n$ is fed into an equalizer delay line 108 with a tap spacing of T/M, where n is the sampling index.

To describe the operation of the adaptive receiver, we denote the complex coefficients of the linear equalizer as $c_n$, $-N_1 \leq n \leq N_2$ ($N_1+N_2+1$ taps). The output of the equalizer is computed once every baud; then, it is demodulated to obtain the sequence $r'_k$. We assume that all coefficients are initially set to zero. The initial values may also be determined using a fast initialization method such as the scheme described in (Chevillat et al., "Rapid Training of a Voice-band Data Modem Receiver Employing an Equalizer with Fractional T-spaced Coefficients, IEEE Trans Commun., vol. COM-35, pp. 869–876, Sep. 1987). In any case, the coefficients of the linear equalizer are adjusted according to $c_{n,k+1}=c_{n,k}-\alpha\epsilon_k z_n^*$, $n=-N_1,\ldots,0,\ldots,N_2$ where $\epsilon_k=r'_k-x_k$ is the error between the equalizer output and the known transmitted symbol $x_k$, and $k=n/M$ is the index for the baud interval. If the step size $\alpha$ is sufficiently small, then the coefficients will converge to values which minimize the MSE. Furthermore, if $N_1$ and $N_2$ are sufficiently large, the filter converges to the optimum MSE linear equalizer that we described earlier.

Once the equalizer has converged, its outputs $r'_k$ are fed into a T-spaced prediction (error) filter with coefficients $h_0=1$ (fixed), $h_1$, and $h_2$. This filter produces $r(D)$, the output of the channel model. Its coefficients are updated according to $$h_{i,k+1}=h_{i,k}-\beta\epsilon^*_{k-i}\epsilon'_k, i=1,2$$

where $\epsilon'_k=r_k-x_k-x_{k-1}h_{1,k}-x_{k-2}h_{2,k}$ is the final error after prediction and $\beta$ is another small step size. Again, when $\beta$ is sufficiently small, these coefficients will converge to their values which minimize the MSE. If the overall channel model can be represented by a three coefficient model as we assumed here, we expect the residual error sequence to be approximately white, as explained earlier.

After convergence, the coefficients $h_1$ and $h_2$ are sent back to the transmitter for use during trellis precoding. This can be accomplished, for example, by simply encoding the coefficients into binary words and transmitting these using 4-QAM signaling. These words are typically sent in a small frame which has a flag for recognizing the start of the frame and an error control check to detect transmission errors. In what follows, we denote the estimated channel response by $h(D)$, and its formal inverse by $g(D)$.

During transmission of actual data from a data terminal equipment (DTE) 120, the prediction filter 110 is kept fixed, but the linear equalizer 108 is continually adapted in a decision-directed mode to track small channel variations. Because of trellis precoding, it is not possible to generate the error signal $\epsilon_k$ directly at the equalizer output, since decisions are available at the output of the prediction filter 110 $h(D)$. Therefore, to reconstruct the equalizer error, the final prediction error $'_k=r_k-y_k'$ between the output $r_k$ of the prediction error filter and the estimated channel symbol $y'_k$ is passed through $g(D)$ 122. The estimates $y'_k$ can be obtained with no delay using a simple slicing operation, or they can be obtained from the Viterbi decoder, albeit after some delay. Experiments indicate that this structure operates reliably even in the presence of decision errors.

Referring again to FIG. 7, in the trellis precoder 124 we use a four dimensional 16-state Wei code for coding (denoted as $\underline{C}_c$) and a two-dimensional 4-state Ungerboeck code for shaping (denoted as $\underline{C}_s$), and we send 6.5 bits per two dimensions (or baud). The code $\underline{C}_s$ is a mod 2 trellis code based on a rate-$\frac{1}{2}$ binary convolutional encoder and the two-dimensional partition $Z^2/2Z^2$. Equivalently, $\underline{C}_s$ can be described by a rate-2/4 convolutional encoder and the four-dimensional partition $Z^4/Z^4$. In this form, $\underline{C}_s$ has the four dimensional time-zero lattice $RZ^4$. The code $\underline{C}_c$, on the other hand, is based on a rate-$\frac{3}{4}$ convolutional encoder and it is scaled such that it is based on the partition $2^{-3}Z^4/2^{-2}Z^4$. This code adds one redundant bit every four dimensions (or equivalently, every two bauds). Note that a fundamental region of the time-zero lattice $RZ^4$ will contain exactly $2^{2 \times 6.5 + 1}$ points from any coset of the scaled lattice $2^{-3}Z^4$; i.e., $|2^{-3}Z^4/RZ^4| = 2^{14}$.

A small buffer 130 is filled with bits received from the DTE at the rate of 6.5 bits per (2D) signaling interval. In successive bauds, a scrambler 132 alternates in taking 7 or 6 bits from this buffer. The scrambled bits are delivered to a binary encoder in groups of 13 so called I-bits, labeled I6(2j) through I0(2j) an I5(2j+1) through I0(2j+1), at two successive times 2j and 2j+1.

Figure 9:
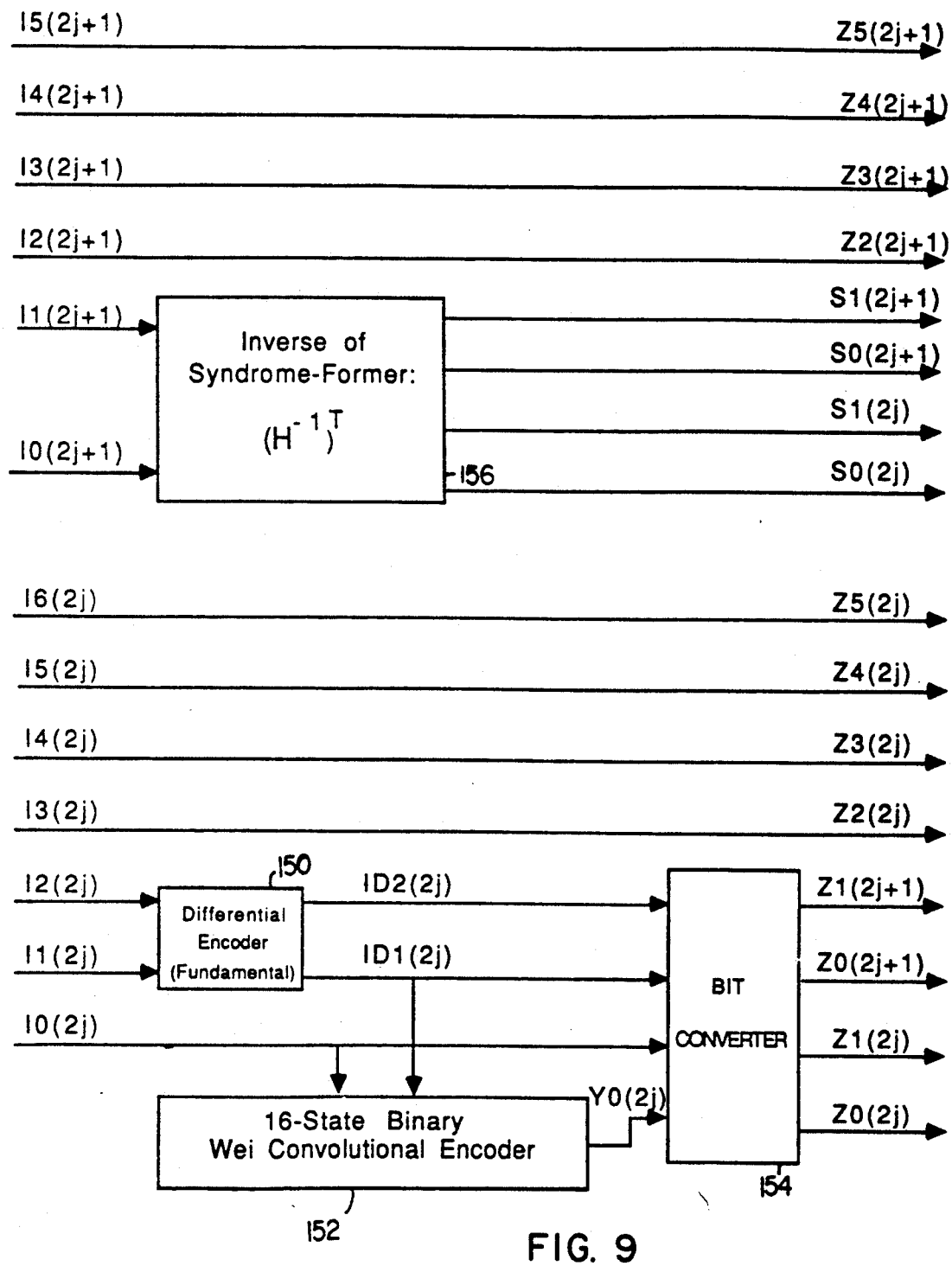
FIG. 9 is a block diagram of binary encoding for trellis precoding.

Referring to FIG. 9, the I-bits I2(2j)I1(2j) are taken to represent an integer mod 4 and are differentially encoded by a coding differential encoder 150 to produce two differentially encoded bits ID2(2j)ID1(2j) according to the relation ID2(2j)ID1(2j)=I2(2j)I1(2j)$\oplus_4$ID2(2j−2)ID1(2j−2) where $\oplus_4$ represents mod-4 addition.

Figure 10:
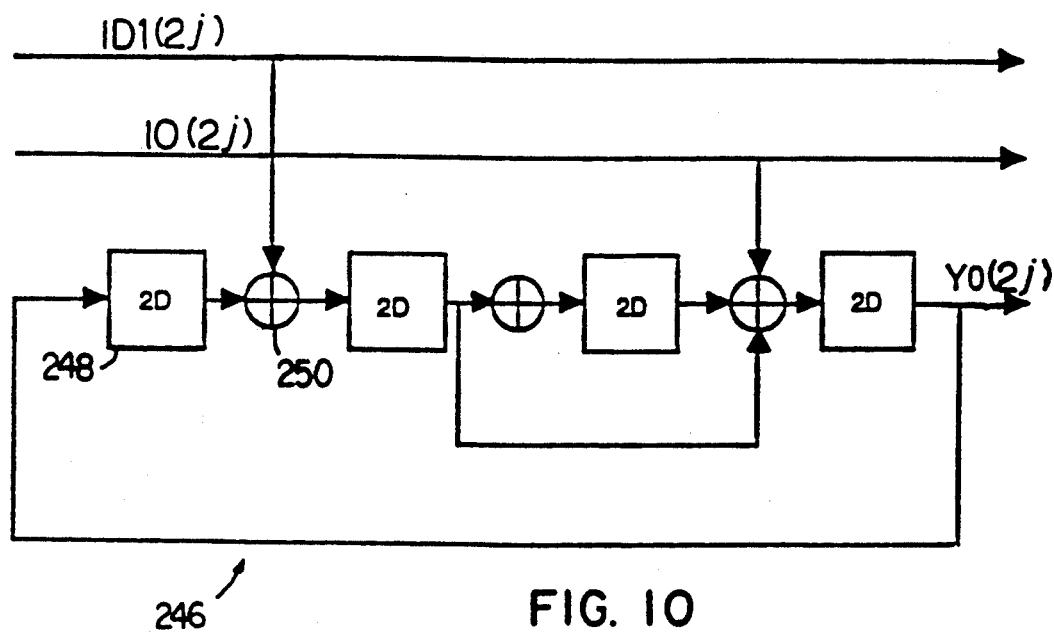
FIG. 10 is a block diagram of a Wei binary convolutional encoder.

The bits ID1(2j) and I0(2j) enter a rate-$\frac{2}{3}$, 16-state binary convolutional encoder 152, which produces one redundant bit Y0(2j). Referring to FIG. 10, this encoder includes a sequential circuit 246 having four delay-2 shift registers 248 and three mod-2 adders 250. (This encoder can also be realized using other circuits.)

Referring again to FIG. 9, the bits ID2(2j)ID1(2j) and the redundant bit Y0(2j) enter a bit converter 154 that generates four output bits Z1(2j)Z0(2j)Z1(2j+1)Z0(2j+1) according to the following table:

| ID2 (2j) | ID1 (2j) | I0 (2j) | Y0 (2j) | Z1 (2j+1) | Z0 (2j+1) | Z1 (2j) | Z0 (2j) |
|---|---|---|---|---|---|---|---|
| 0 | 0 | 0 | 0 | 0 | 0 | 0 | 0 |
| 0 | 0 | 0 | 1 | 1 | 0 | 0 | 0 |
| 0 | 0 | 1 | 0 | 0 | 1 | 0 | 0 |
| 0 | 0 | 1 | 1 | 1 | 1 | 0 | 0 |
| 0 | 1 | 0 | 0 | 1 | 0 | 1 | 0 |
| 0 | 1 | 0 | 1 | 0 | 1 | 1 | 0 |
| 0 | 1 | 1 | 0 | 1 | 1 | 1 | 0 |
| 0 | 1 | 1 | 1 | 0 | 0 | 1 | 0 |
| 1 | 0 | 0 | 0 | 0 | 1 | 0 | 1 |
| 1 | 0 | 0 | 1 | 1 | 1 | 0 | 1 |
| 1 | 0 | 1 | 0 | 0 | 0 | 0 | 1 |
| 1 | 0 | 1 | 1 | 1 | 0 | 0 | 1 |
| 1 | 1 | 0 | 0 | 1 | 1 | 1 | 1 |
| 1 | 1 | 0 | 1 | 0 | 0 | 1 | 1 |
| 1 | 1 | 1 | 0 | 1 | 0 | 1 | 1 |
| 1 | 1 | 1 | 1 | 0 | 1 | 1 | 1 |

These output bits are used to select one of 16 cosets of $2^{-2}Z^4$ whose union is the four-dimensional grid $2^{-3}Z^4 + (2^{-4}, 2^{-4}, 2^{-4}, 2^{-4})$. Each such coset is represented by a pair of cosets of $2^{-2}Z^2$ in the two-dimensional grid $2^{-3}Z^2 + (2^{-4}, 2^{-4})$. These are selected individually by Z1(2j)Z0(2j) and Z1(2j+1)Z0(2j+1).

The remaining I-bits I3(2j) through I6(2j) pass through unchanged, are relabeled as Z2(2j) through Z5(2j). They are combined with Z1(2j)Z0(2j) to form the six-tuple Z5(2j)Z4(2j) ... Z0(2j). Similarly, the I-bits I2(2j+1) through I5(2j+1) together with Z1(2j+1)Z0(2j+1) form the six-tuple Z5(2j+1)Z4(2j+1) ... Z0(2j+1).

Figure 11A:
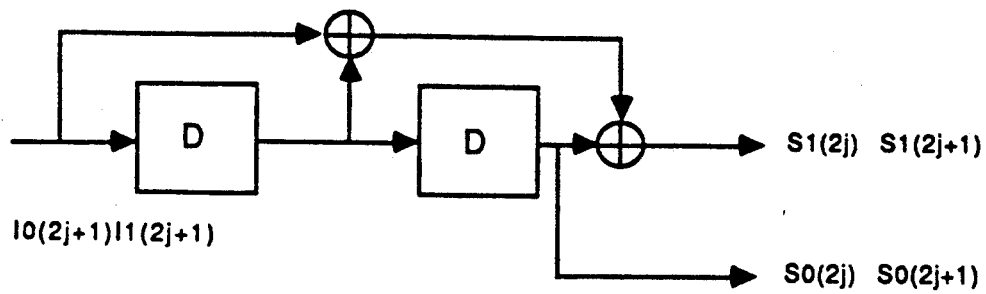
FIG. 11A is a block diagram of a binary inverse syndrome former.

The I-bits I1(2j+1)I0(2j+1) sequentially enter a rate-$\frac{1}{2}$ inverse syndrome former $(H^{-1})^T$ 156. H is a syndrome former of the binary code $\underline{C}_s$ defined above. Referring to FIG. 11A, $(H^{-1})^T$ produces two pairs of S-bits S1(2j)S0(2j) and S1(2j+1)S0(2j+1). As discussed earlier and disclosed in Forney and Eyuboglu, Trellis Shaping for Modulation Systems, U.S. patent application cited above, $(H^{-1})^T$ is the inverse of $(H)^T$ discussed below, and is included to limit error propagation.

Figure 12:
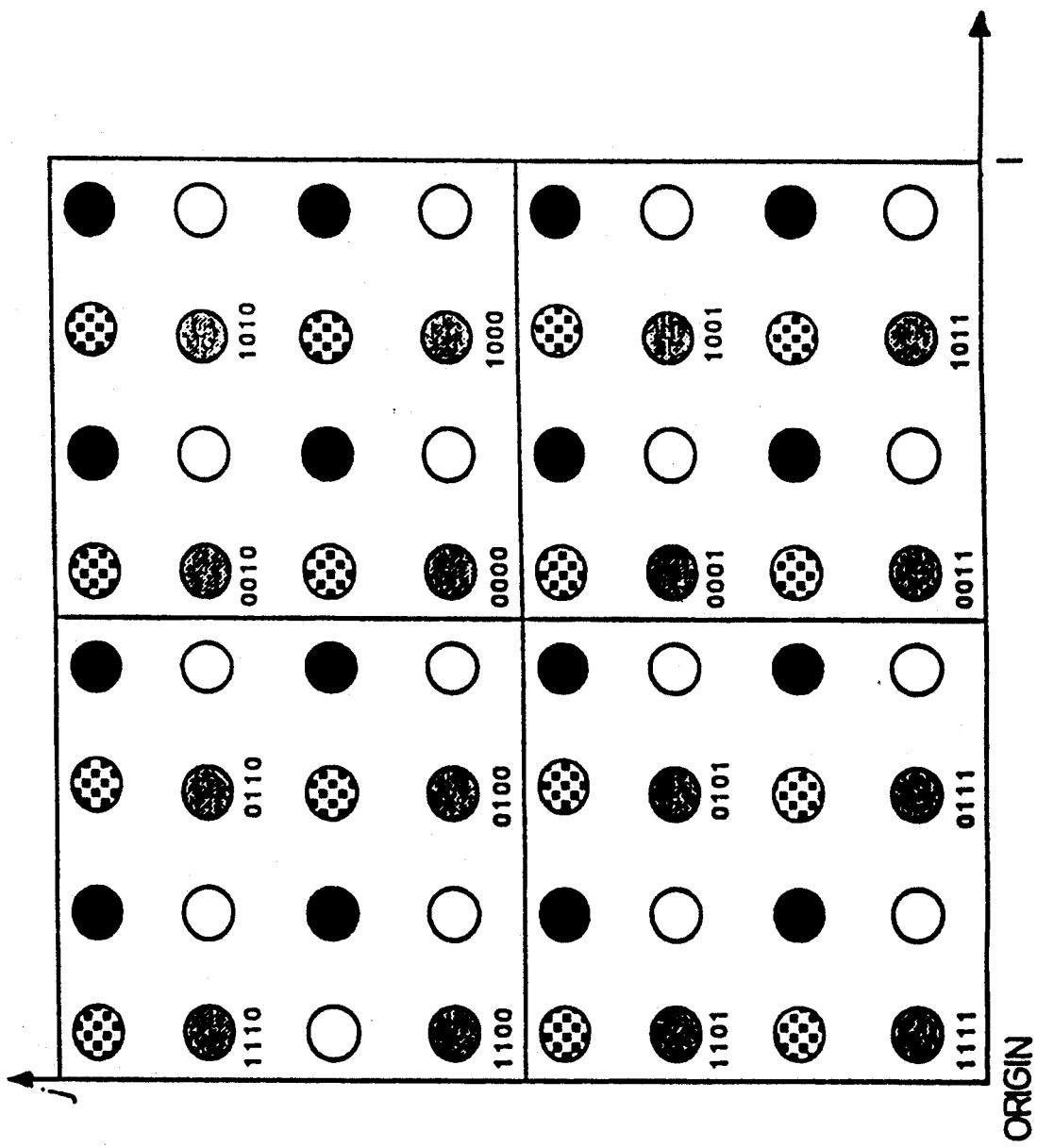
FIG. 12 is a diagram of a quadrant of a signal set.

Referring to FIG. 12, the 16-bits generated in this manner are mapped into two initial signal points r(2j) and r(2j+1) chosen from a 256-point two-dimensional square signal set which lies on the grid $2^{-3}Z^2 + (2^{-4}, 2^{-4})$. First, the six-tuple Z-bits are used to select a signal point from the 64-point quadrant-1 signal set 261. This signal set is divided into four subsets which are cosets of $2^{-2}Z^2$ (indicated by different shadings in FIG. 12). The signal points are labeled such that Z1 and Z0 together select one of the cosets according to the labeling shown in the lower left corner of FIG. 12. The labeling of the remaining bits Z5,Z4,Z3,Z2 is shown only for coset a. For other cosets, the labeling can be obtained by the rule that 90 degree rotation of a point around the center ($\frac{1}{2}$, $\frac{1}{2}$) of the quadrant-1 signal points result in the same labeling.

The Wei encoder 152 (FIG. 9) insures that the minimum distance between allowable sequences of quadrant-1 points is kept large.

The S bits S1, S0 determine the final quadrant of the initial point according to the rule:

| S1S0 | Quadrant |
|---|---|
| 00 | 1 |
| 01 | 4 |
| 10 | 2 |
| 11 | 3 |

Figure 13:
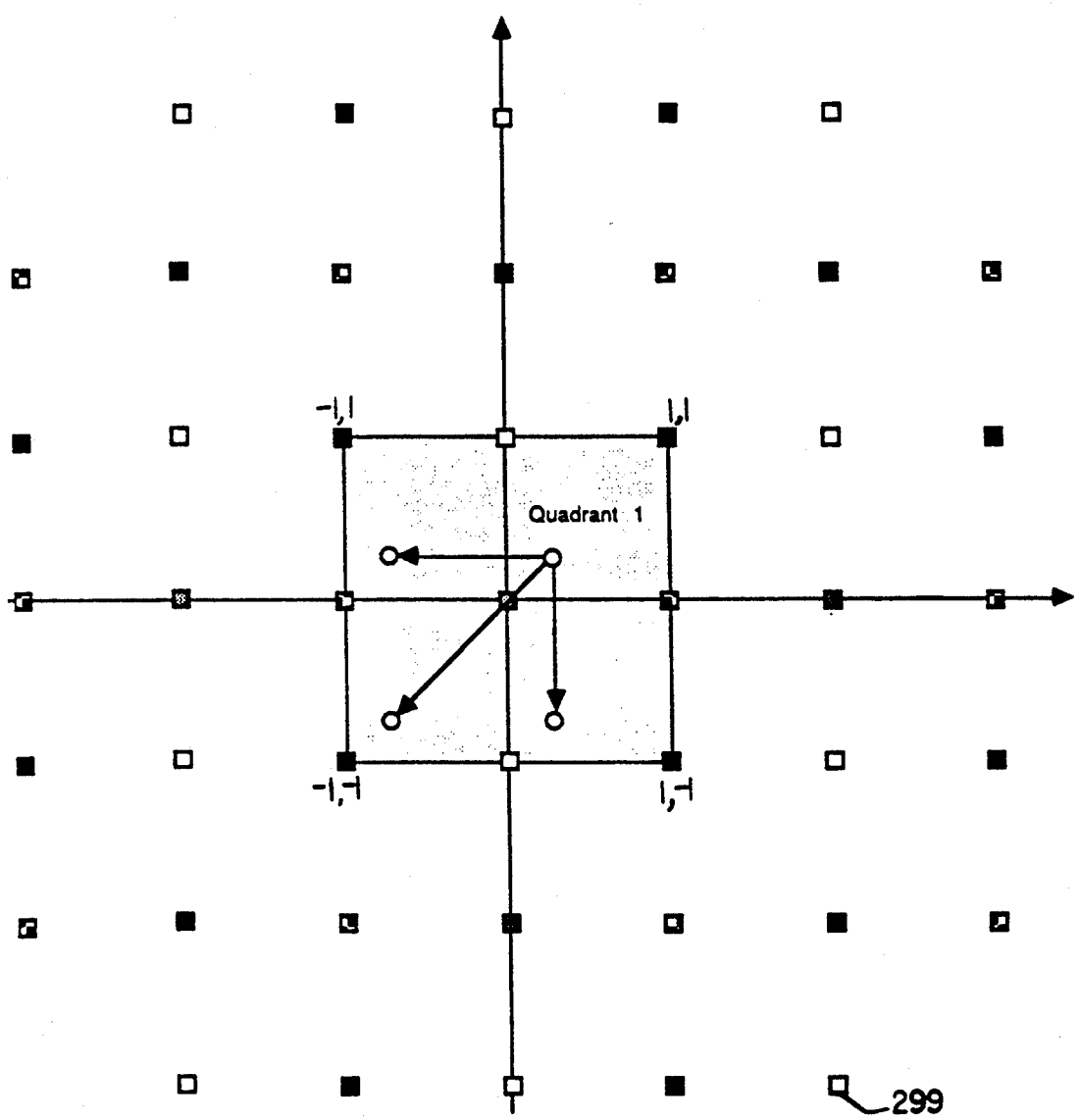
FIG. 13 is a diagram of quadrant shifting.

Referring to FIG. 13, the signal points in quadrant 1 are moved to the quadrant chosen by the S-bits in such a way that they remain in the same coset of $Z^2$. This is done by offsetting the quadrant-1 point by (0,0), (0,−1), (−1, −1) or (−1,0). It follows that the translated final point is in the same coset of $2^{-2}Z^2$ as the quadrant-1 point. Therefore, the minimum distance between allowable sequences remains unchanged. The signal points obtained in this manner form the initial sequence x(D). Thus the S-bits can be viewed as a coset representative sequence which determines the coset of $2Z^2$ in $Z^2$ for the elements of initial sequence X(D).

Figure 14:
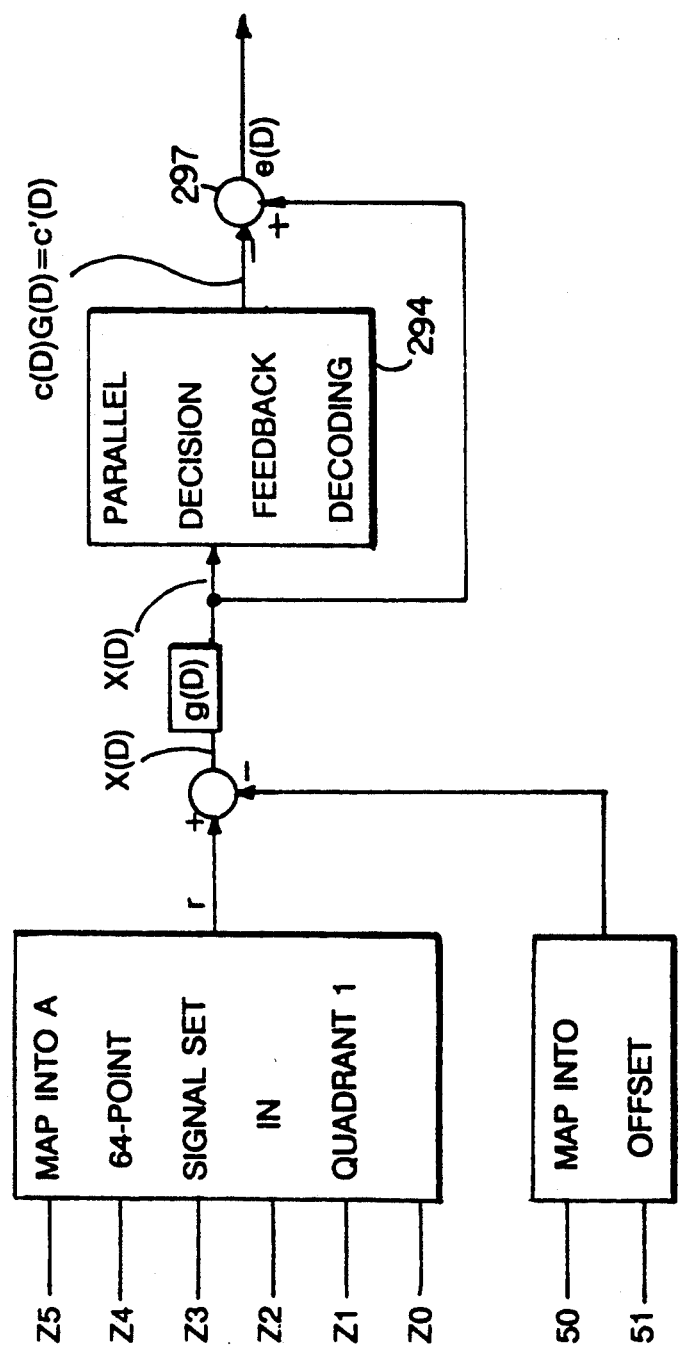
FIG. 14 is a diagram of portions of the trellis precoder of FIG. 7.

Referring to FIG. 14 the initial sequence x(D) is transformed into the transmitted sequence e(D) using parallel decision feedback decoding (PDFD) 294 (which, along with the circuitry of FIG. 9, is part of the trellis precoder 124 of FIG. 7). It is possible to replace PDFD by a more powerful RSSE decoder, or by some other reduced-complexity decoder for the filtered trellis code $C_s'$.

As we saw earlier, the optimum decoder selects from the shaping code $\underline{C}_s$ the code sequence c(D) which minimizes the mean squared error between the sequences x'(D)=x(D)g(D) and c'(D)=c(D)g(D). The transmitted sequence is the error sequence e(D)=x'(D)-c'(D). The code sequence selected by PDFD will not generally result in minimum MSE, however, experiments indicate that the excess MSE will often be small. For example, for a channel with two coeffients, PDFD can achieve 0.5-0.85 dB shaping gain, depending on the values of $h_1$ and $h_2$.

Now, we consider the operation of PDFD in some detail. First, we describe the shaping code $\underline{C}_s$.

Referring again to FIG. 13, the two-dimensional symbols of this code are chosen from the integer lattice in $Z^2$ 299. These symbols are partitioned into four subsets which correspond to the (four) cosets of $2Z^2$ in $Z^2$ and are labeled as A, B, C and D as shown in the lower-left corner of FIG. 13.

Figure 15:
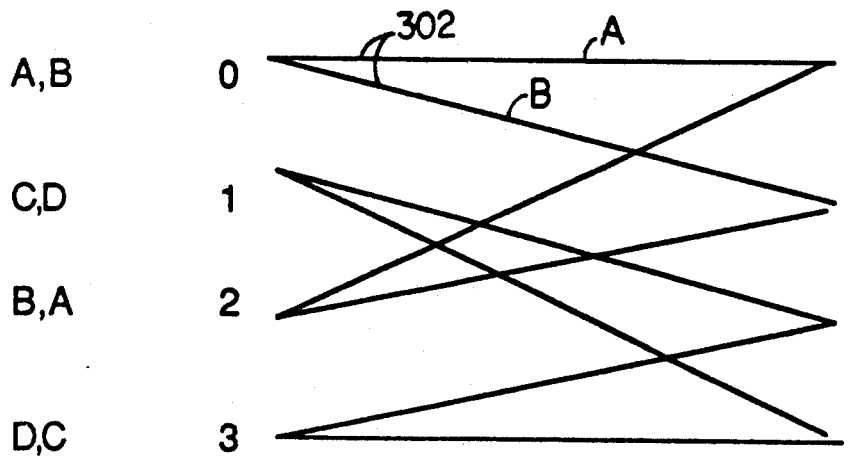
FIG. 15 is a trellis diagram.

All possible sequences c(D) in the shaping code $\underline{C}_s$ are represented by the trellis diagram of FIG. 15. Here, from any state there are two branches 302, each branch representing a two-dimensional subset. For example, state 0 has two branches labeled A and B.

PDFD operates recursively using the Viterbi algorithm and in synchronism with the four-dimensional Wei encoder such that every other baud it releases two delayed error symbols $e(2j-M)$ and $e(2j+1-M)$, where M (an even number) is the decoding delay measured in number of bauds. Every baud interval, the VA has in storage four path metrics $\lambda_i(2j+1)$, $i=0,1,2,3$ and $l=0,1$, one for each state in the trellis diagram. Here l indicates odd or even baud. The VA also has in storage a finite history of previously hypothesized error symbols $e_i(2j+1-m)$, $i=0,1,2,3$, $l=0,1$ and $m=1,2,\ldots,M$, one for each state. In each iteration (every baud), the paths are extended by incrementing path metrics by the branch metrics; the branch metric for the path branch p(p=1,2) from the i'th state is described by $$b_{i,p}(2j+l) = |-e_i(2j+l-1)h_1 - e_i(2j+l-2)h_2 + x(2j+l) - c_{i,p}(2j+l)|^2$$

where $c_{i,p}(2j+l)$ is a symbol from the coset of $2Z^2$ associated with this branch that gives the minimum value for the branch metric. For each state i' after the transition, the accumulated metric of the two merging paths are compared and the path with the smaller metric is declared a survivor; its path metric becomes the new path metric for state i' and the error symbol for the surviving transition (i*,p*), which is given by $$e_{i'}(2j+l) = -e_{i^*}(2j+l-1)h_1 - e_{i^*}(2j+l-2)h_2 + x(2j+l) - c_{i^*,p^*}(2j+l),$$

becomes its most recent error symbol stored in its path history for subsequent use. Every other baud, or when l=1, the algorithm determines the state with the minimum path metric, traces back its error symbol history for M symbols, and releases the error symbols for times $2j-M$ and $2j-M+1$ as outputs.

Note that the error symbols generated by the precoder 124 lie inside the Voronoi region of the sublattice $2Z^2$, which is a square of side 2, centered at the origin, independent of the channel response h(D). When $h_1$ and $h_2$ are both non-integers, then the error symbols can take infinitely many values within that square.

In trellis precoding using trellis codes that are based on partitions of binary lattices, the elements $e_j$ of the transmitted sequence belong to a 2 D constellation that lies within a square boundary. Furthermore, trellis precoding expands the size of the 2D constellation. These effects increase the peak-to-average ratio of the transmitted symbols, which may be undesirable. It is possible to reduce the constellation expansion, and obtain a more circular boundary by applying constraints to PDFD (FIG. 4). For example, PDFD can be constrained in such a way that it only selects code sequences c'(D) (from the filtered code $\underline{C}_s'$) which result in transmitted sequences c(D) whose elements $e_j$ have magnitudes no greater than some predetermined radius $R_c$; i.e., $|e_j| \leq R_c$. When $R_c$ is reasonably large, the decoder can proceed without violating the constraint. However, if $R_c$ is too small, it may be forced to select a code sequence that does not satisfy this constraint.

This type of constraint can be incorporated into an RSSE type decoder very easily by deemphasizing those branches of the trellis whose mean-squared error (MSE) metrics exceed $R_c^2$, by multiplying them with an appropriately chosen number Q. The larger Q gets, the harder the constraint becomes. This reduces the probability of choosing points lying outside the constraint circle. When Q is sufficiently large, and $R_c$ is not very small, points outside the constraint circle will never be selected. Note that if $R_c$ is too small, one should not disallow branches, because this may force the decoder to choose an illegal sequence as a code sequence, and then the initial sequence r(D) cannot be correctly recovered in the receiver.

When the transmitted sequence e(D) is filtered before transmission over the channel, it may be beneficial to apply the constraint in higher dimensions (on groups of successive elements of the sequence e(D)), in order to minimize the PAR after the filtering. For example, the constraint may be applied in four dimensions by comparing the sum of the two most recent branch metrics against some squared radius $R_c^2$.

The VA is further slightly modified to insure that the code sequence c(D) it selects is an allowable sequence from $\underline{C}_s'$, since otherwise the initial sequence e(D) cannot be correctly recovered. Whenever the VA traces back the path history to make a decision, it traces back other paths as well to determine whether they end in the same state; when they don't, those paths are pruned by setting their current path metric to a very large value. This insures that only allowable code sequences are selected.

The precoded sequence e(D) is passed through the transmitter shaping filter 106 (FIG. 7), D/A converted, filtered by the analog front-end 107 and subsequently transmitted over the channel.

At the receiver, the received signal r(t) is first filtered by the analog filter 109 (FIG. 7) to remove out-of-band noise, and A/D converted into a digital stream $(z_n)$ at a rate of M/T. This digital stream is input into the adaptive linear equalizer 108 with $N_1+N_2+1$ taps and a tap spacing of T/M. The output of this filter is sampled at the baud rate 1/T, then demodulated and subsequently filtered by the prediction filter h(D) 110 to approximately produce the received sequence $$r(D) = e(D)h(D) + n'(D) = x(D) - c(D) + n'(D) = y(d) + n'(D).$$

As we discussed earlier the elements of y(D) lie in the same coset of $Z^2$, and thus the same coset of $2^{-2}Z^2$ in $2^{-3}Z^2$. Therefore, the minimum distance between possible sequences y(D) is no smaller than the minimum distance between possible input sequences x(D) and the sequence y(D) can be decoded with a Viterbi decoder 133 for x(D), except the decoder must be slightly modified to take into account the potentially larger signal set boundary for the elements $y_j$ of y(D).

It can be shown that the shape and size of the signal set boundary for $y_j$'s depend on the channel coefficients $h_1$ and $h_2$. For example, if $h_1$ and $h_2$ are both real, the boundary will be a square of side length $2(1+h_1+h_2)$, again centered at the origin. If the output constellation size is of concern, it may be beneficial to limit the magnitudes of the coefficients during training. This may be accomplished using a constrained adaptation algorithm.

It is possible to make the decoder 133 transparent to the constellation expansion that is caused by the channel filter. If we take the received sequence y(D) and translate it by some sequence t(D), where the elements of t(D) are elements of the lattice $2Z^2$, then the modified sequence $y(D)-a(D)=x(D)-c(D)-a(D)$ is still equal to x(D) mod $\underline{C}_s$, since the component $c(D)+a(D)$ is an allowable code sequence. It follows that the received sequence can be translated inside the Voronoi region of $2Z^2$ (Voronoi regions were defined, for example, in Conway & Sloane, Sphere Packings, Lattices, Groups, New York, Springer-Verlag, 1988) mod $2Z^2$. The Viterbi algorithm for the (coding) code $\underline{C}_c$ can now operate on this translated sequence assuming a square boundary and output a delayed estimated sequence y"(D).

Every other baud, the VA will produce two delayed decisions y"(2j) and y"(2j+1). To extract the I-bits from these, we first obtain the Z-bits by translating the decisions into quadrant 1, in such a way that the 2D elements remain in the same coset of $Z^2$. Then, the Z-bits can be extracted using an inverse mapping according to FIG. 12.

To extract the S-bits, we first label the quadrants (as before) according to

| Quadrant | SQ1SQ2 |
|---|---|
| 1 | 00 |
| 2 | 01 |
| 3 | 11 |
| 4 | 01 |

Then, the quadrants of y"(2j) and y"(2j+1) determine the labels SQ1(2j)SQ0(2j) and SQ1(2j+1)SQ0(2j+1). It is easy to show that SQ1(i)SQ0(i)=S1(i)S0(i)$\oplus_2$B1(i)B0(i), where i=2j or 2j+1, $\oplus_2$ represents exclusive-or operation and B1(i)B0(i) is a binary two-tuple represeting the coset (A=00, B=11, C=01 and D=10) of $2Z^2$ for the code symbol c(i) chosen during precoding by PDFD.

Figure 11B:
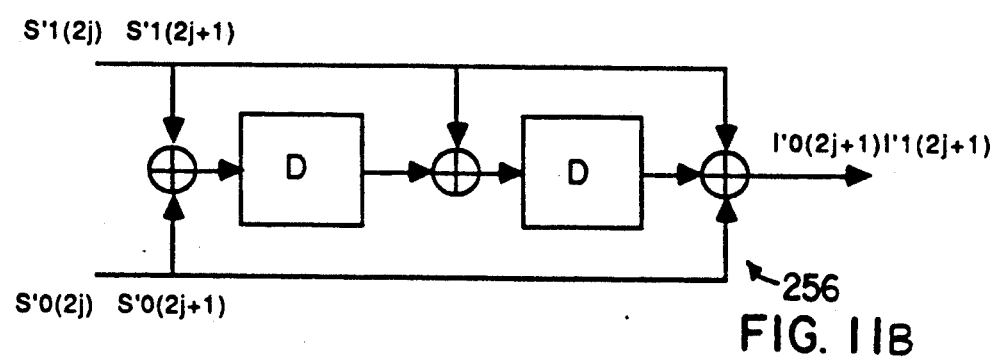
FIG. 11B is a block diagram of a binary syndrome former.
Figure 16:
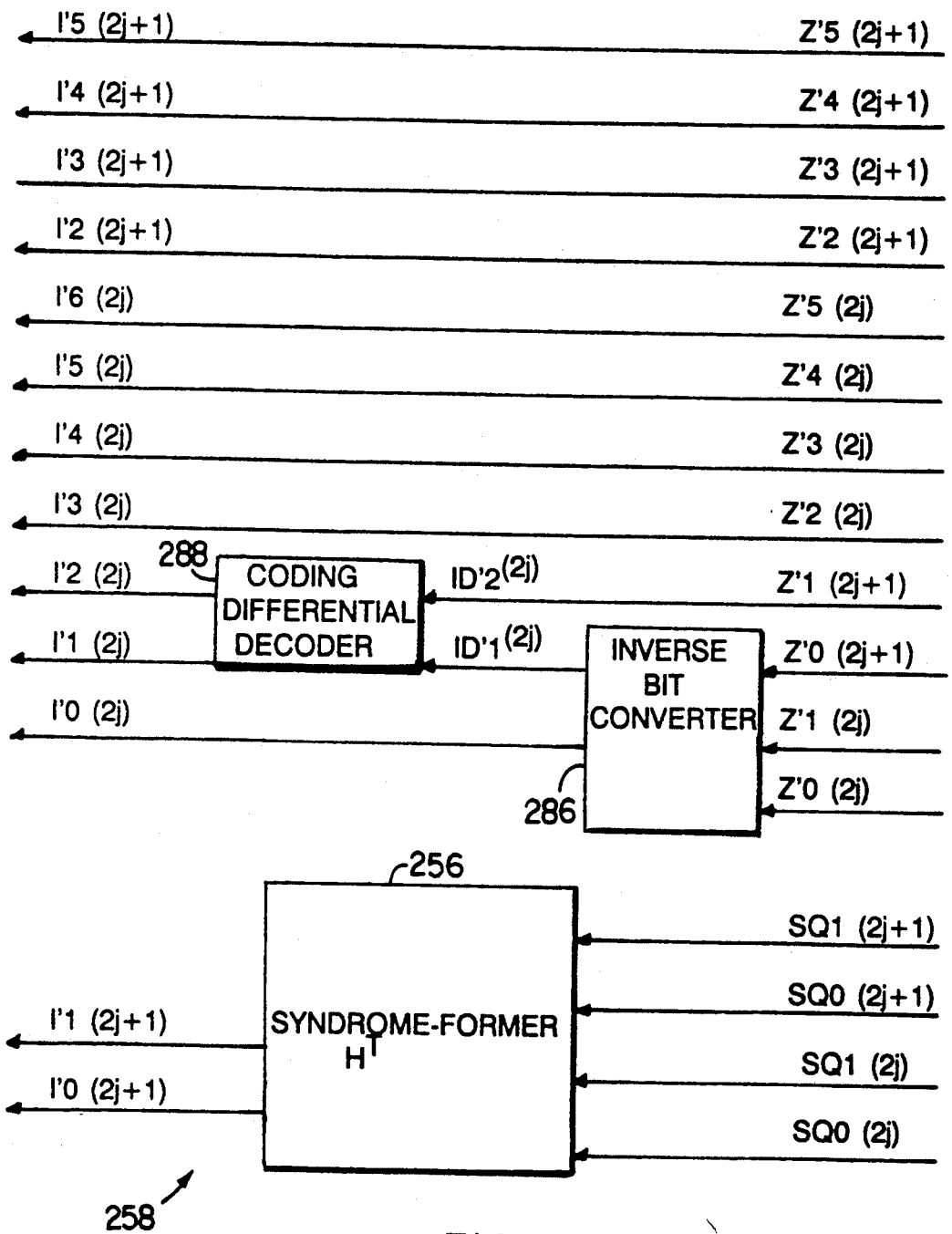
FIG. 16 is a block diagram of the binary portion of the trellis decoder.

Referring to FIGS. 11B and 16, the labels SQ1(i)SQ0(i) are then sequentially passed through a feedback-free rate-2 syndrome-former $H^T$ 256. The syndrome-former has the property that any allowable sequence of coset labels B1(i)B0(i) will produce an all-zero sequence at its output. Furthermore, $(H^{-1})^T H^T = I$, the identity matrix. Therefore, a sequence which first passes through $(H^{-1})^T$ and then through $H^T$ will remain unchanged. Thus, as shown in FIG. 16, at the output of the syndrome-former we obtain the transmitted bits I1'(2j+1)I0'(2j+1), as long as the estimates y"(i) are correct. When there are occasional errors, they do not create catastrophic error propagation, because $H^T$ is feedback-free.

Referring again to FIG. 16, the remaining information bits can be recovered by an inverse bit converter 286 and a coding differential decoder 288 which operates according to the relation:

$$I2'(2j)I1'(2j)=ID2'(2j)ID1'(2j) \oplus_4 ID2'(2j-2)ID1(2j-2)$$

where $\oplus_4$ is a modulo-4 subtraction. Referring again to FIG. 8 the I-bits are then descrambled in a descrambler which forms part of unit 133 and delivered to the DTE via a buffer 135.

Differential Coding for Shaping

Suppose the channel introduces a phase rotation of 90 k degrees, k=1, 2, or 3. The translation of the error point into quadrant-1 is then rotated around the point ($\frac{1}{2}$, $\frac{1}{2}$) by the same amount. Since the Wei code is transparent to 90 degree phase rotations, the mapping used in the transmitter guarantees that the Z-bits can be correctly recovered. Unfortunately, this is not true for the quadrant labels SQ1SQ0.

Figures 17, 19:
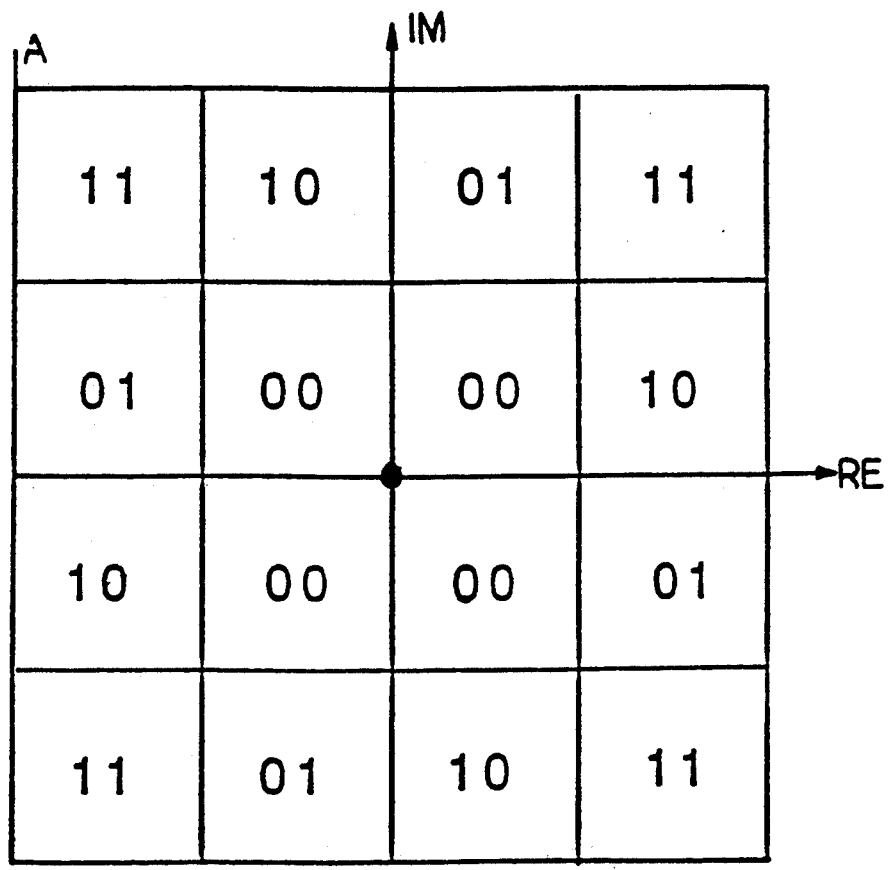
FIG. 17 is a diagram of a phase-invariant labeling scheme.
FIG. 19 is a diagram of a quadrant labeling scheme.
Figure 18:
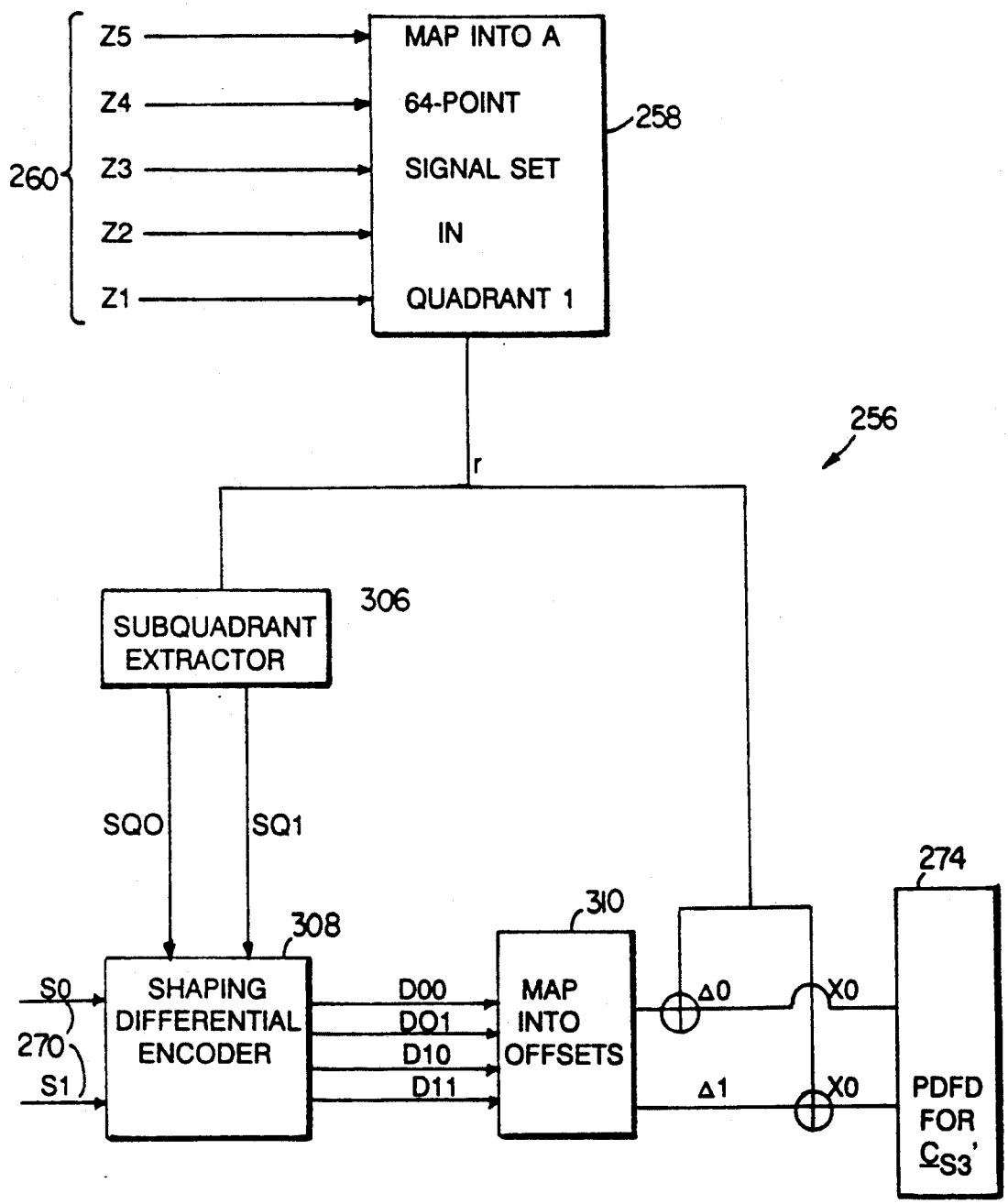
FIG. 18 is a block diagram of a constellation former.

To remedy this situation, the label sequence SQ1SQ0 can be generated according to the phase-invariant labeling shown in FIG. 17. In order to guarantee that the relationship SQ1SQ0=S1S0$\oplus_2$B1B0 still holds, a differential encoding operation is necessary. This is done as follows: Referring to FIG. 18, for each signal point obtained through quadrant-1 mapping 258, we extract its subquadrant label SQ1SQ0 with a subquadrant extractor 306 according to FIG. 19. A shaping differential encoder 308 and a map into offsets 310 use the bits SQ1SQ0 and S1 S0 to offset the quadrant-1 point into two new points x0(i) and x1(i), where i=2j or i=2j+1 such that they remain in the same coset of $Z^2$. This mapping can be described by the following two tables:

| SQ0 | SQ1 | S0 | S1 | D00 | D01 | D10 | D11 |
|---|---|---|---|---|---|---|---|
| 0 | 0 | 0 | 0 | 0 | 0 | 1 | 1 |
| 0 | 0 | 0 | 1 | 1 | 0 | 0 | 1 |
| 0 | 0 | 1 | 0 | 0 | 1 | 1 | 0 |
| 0 | 0 | 1 | 1 | 1 | 1 | 0 | 0 |
| 0 | 1 | 0 | 0 | 0 | 1 | 0 | 1 |
| 0 | 1 | 0 | 1 | 0 | 0 | 0 | 0 |
| 0 | 1 | 1 | 0 | 1 | 1 | 1 | 1 |
| 0 | 1 | 1 | 1 | 1 | 0 | 1 | 0 |
| 1 | 0 | 0 | 0 | 1 | 0 | 1 | 0 |
| 1 | 0 | 0 | 1 | 1 | 1 | 1 | 1 |
| 1 | 0 | 1 | 0 | 0 | 0 | 0 | 0 |
| 1 | 0 | 1 | 1 | 0 | 1 | 0 | 1 |
| 1 | 1 | 0 | 0 | 1 | 0 | 1 | 1 |
| 1 | 1 | 0 | 1 | 0 | 1 | 1 | 1 |
| 1 | 1 | 1 | 0 | 1 | 0 | 1 | 1 |
| 1 | 1 | 1 | 1 | 0 | 0 | 1 | 1 |

| Di0 | Di1 | $\Delta$ i (offset) |
|---|---|---|
| 0 | 0 | 0.0 + j0.0 |
| 0 | 1 | 0.0 − j1.0 |
| 1 | 0 | −1.0 + j0.0 |
| 1 | 1 | −1.0 − j1.0 |

In the PDFD decoder, the point x0(i) is used for branches corresponding to cosets A and B, whereas x1(i) is used for branches corresponding to cosets C and D. It can be shown that if SQ1SQ0 is the subquadrant label of the received point, then SQ1SQ0=S1S0$\oplus_2$B1B0. Therefore, by passing the subquadrant label (which is rotationally invariant)

through the syndrome-former $H^T$ we can recover the bits $I0(2j+1)$, $I1(2j+1)$ and $I2(2j+1)$, even in the presence of 90k degrees phase offset.

Extension to Nonlinear Trellis Codes

While we have found that linear (mod-2) trellis codes can achieve most of the shape gain possible, we shall now sketch briefly how the methods of this specification may be extended to nonlinear shaping trellis codes $\underline{C}$.

For known practical nonlinear trellis codes $\underline{C}$, there is still an associated time zero lattice such that for any state $s_j$ of the encoder, the set of possible next signal points is a coset $\Lambda_0 + a(s_j)$ of the time-zero lattice $\Lambda_0$ of $\underline{C}$.

A simple fundamental region of $\underline{C}$ may then again be specified by a hard-decision decoder for $\underline{C}$ that is based on any fundamental region $R_0$ of the time-zero lattice $\Lambda_0$ of $\underline{C}$. Given the state $s_j$ at time j and any $r_j$ in $R^N$, this decoder finds the unique code symbol $c_j$ in $\Lambda_0 + a(s_j)$ such that $r_j = c_j + e_j$, where $e_j$ is an element of $R_0$. The next state $s_{j+1}$ is then determined by $c_j$. Thus this hard-decision decoder decomposes any sequence $r(D)$ in sequence space $(R^N)^\infty$ into a sum $r(D) = c(D) + e(D)$, where $c(D)$ is in $\underline{C}$ and $e(D)$ is in $(R_0)^\infty$.

We therefore say that $(R_0)^\infty$ is a simple fundamental region of the code $\underline{C}$. The whole of sequence space $(R^N)^\infty$ is covered by the nonoverlapping translates $(R_0^\infty + c(D))$, where $c(D)$ ranges through all code sequences in $\underline{C}$.

The general implementation of a trellis precoding system as shown in FIG. 3 et seq follows as before. The data sequence is first mapped into an initial sequence that lies in the simple fundamental region $(R_0)^\infty$. An RSSE decoder for the filtered code $\underline{C}' = \underline{C}g(D)$ then finds a code sequence $c'(D)$ in $\underline{C}$ such that the average power of the difference sequence $e(D) = x(D)g(D) - c'(D)$ is reduced. The sequence $e(D)$ is subsequently transmitted. In the absence of noise, after channel filtering we receive $y(D) = e(D)h(D) = x(D) - c(D)$. Note that it follows from the above argument that $x(D)$ is congruent to $x(D)$ mod $\underline{C}$. Therefore the initial sequence $x(D)$ can be recovered from the received sequence $y(D)$ by using the hard-decision decoder for $\underline{C}$ based on the fundamental region $R_0$ of the time-zero lattice of C that was first described above.

Hexagonal 2D Constellations

If we choose the shaping trellis code $C(\Lambda/\Lambda';C)$ as a code based on a partition $\Lambda/\Lambda'$ of so-called ternary or quaternary lattices whose constituent 2D lattice and sublattice $\Lambda_2$ and $\Lambda_2'$ are versions of the hexagonal 2D lattice $A_2$, then the elements $e_j$ of the transmitted sequence will be bounded within a region $R_v(\Lambda_2')$ which is hexagonal rather than square. Such a constellation has the advantage of being more nearly spherical.

Other embodiments are also within the following claims. For example, other reduced-complexity decoders (e.g., M algorithm) could be used.

We claim:

1. A method of mapping a digital data sequence into a signal point sequence for data transmission over a channel characterized by a non-ideal response, comprising
defining a filtered trellis code,
selecting said signal point sequence from a subset of all possible signal point sequences based on said digital data sequence and upon said response, all possible signal point sequences in said subset lying in a fundamental region of a filtered trellis code, said fundamental region being other than a simple Cartesian product of finite-dimensional regions.

2. The method of claim 1 in which said filtered trellis code is the code whose sequences are $c'(D) = c(D)g(D)$ where $g(D)$ is the formal inverse of a response related to said non-ideal response of said channel and $c(D)$ is any code sequence in a selected ordinary trellis code.

3. The method of claim 2 in which the selecting step tends to minimize the average power of the signal point sequence $e(D) = [x(D) - c(D)]g(D)$, where $x(D)$ is an initial sequence to which said digital data sequence is initially mapped.

4. The method of claim 3 wherein $x(D)$ lies in a fundamental region of said ordinary trellis code.

5. The method of claim 4 wherein said fundamental region of said ordinary trellis code is a simple Cartesian product of finite dimensional regions.

6. The method of claim 2 in which said selecting of said signal point sequence comprises reduced state sequence estimation with respect to said filtered trellis code.

7. The method of claim 6 in which the reduced state sequence estimation uses no more states than the number of states of the ordinary trellis code.

8. The method of claim 2 wherein said fundamental region of said filtered trellis code comprises approximately a Voronoi region of said filtered trellis code.

9. The method of claim 2 wherein said fundamental region of said filtered trellis code comprises the set of said possible signal point sequences that are decoded to the zero sequence in said filtered trellis code by some decoder for said filtered trellis code.

10. The method of claim 9 wherein said fundamental region of said filtered trellis code comprises the set of said possible signal point sequences that are decoded to the zero sequence in said filtered trellis code by an approximation to a minimum distance decoder for said filtered trellis code.

11. The method of claim 10 wherein said fundamental region of said filtered trellis code comprises the set of said possible signal point sequences that are decoded to the zero sequence in said filtered trellis code by a minimum distance decoder with delay M, wherein M is greater than or equal to 1.

12. The method of claim 1 further comprising recovering the digital data sequence from a possibly noise-corrupted version of the signal point sequence, including decoding the signal point sequence to a sequence of estimated digital elements and forming a syndrome of fewer digital elements based on a portion of the estimated digital elements using a feedback-free syndrome former $H^T$.

13. The method of claim 1 wherein said selecting comprises selecting an initial sequence lying in a fundamental region of said filtered trellis code that is a simple Cartesian product of finite-dimensional regions.

14. The method of claim 5 wherein said finite dimensional fundamental region is a fundamental region of the time-zero lattice of said ordinary trellis code.

15. The method of claim 2 wherein said selecting comprises
mapping said digital data sequence into an initial sequence belonging to and representing a congruence class of said ordinary trellis code, and choosing a signal point sequence belonging to and representing a congruence class of said filtered trellis code and which has no greater average power than said initial sequence, and wherein said mapping includes applying a portion of the elements of said digital data sequence to a coset representative generator for forming a larger number of digital elements representing a coset representative sequence.

16. The method of claim 15 wherein said coset representative generator comprises a multiplication of a portion of the elements of said digital data sequence by a coset representative generator matrix $(H^{-1})^T$ which is inverse to a syndrome-former matrix $H^T$ for said filtered trellis code.

17. The method of claim 16 further comprising recovering the digital data sequence from a possibly filtered and noise-corrupted version of the signal point sequence, including decoding the signal point sequence to a sequence of estimated digital elements and forming a syndrome of fewer digital elements based on a portion of the estimated digital elements using a feedback-free syndrome former $H^T$.

18. The method of claim 2 wherein said ordinary trellis code is a linear trellis code.

19. The method of claim 2 wherein said ordinary trellis code is a non-linear trellis code.

20. The method of claim 18 wherein said linear trellis code is a 4-state Ungerboeck code.

21. The method of claim 2 wherein said ordinary trellis code is based on a partition of binary lattices.

22. The method of claim 2 wherein said ordinary trellis code is based on a partition of ternary or quaternary lattices.

23. The method of claim 15 in which the mapping of said digital data sequence into said initial sequence is linear or distance invariant.

24. The method of claim 2 wherein the step of selecting said signal point sequence is further constrained so as to reduce the peak power of said signal point sequence where said peak power represents the maximum energy of said signal point sequence in some number of dimensions N.

25. The method of claim 24 wherein N=2.

26. The method of claim 24 wherein N=4.

27. The method of claim 24 wherein said selecting is constrained so that said signal point sequence will usually be within some sphere of radius $R_c$.

28. The method of claim 6 wherein said reduced state sequence estimation comprises a step wherein, in each recursion, there is an operation that will assure that said sequence c(D) is an allowable sequence.

29. The method of claim 28 wherein said operation comprises adjusting the metrics of selected paths in the trellis of said reduced state sequence estimation, so that none of said selected paths will become the most likely path in the next recursion.

30. The method of claim 29 in which said paths are chosen based on whether they include particular state transitions at particular locations in said trellis.

31. The method of claim 29 in which said operation comprises assigning a large metric to said selected paths in said trellis.

32. The method of claim 2 wherein said step of mapping said digital data sequence into said signal point sequence is arranged to ensure that said digital data sequence can be recovered from a channel-affected version of said signal point sequence which has been subjected to one of a number of predetermined phase rotations.

33. The method of claim 14 wherein said step of mapping said digital data sequence into a sequence of signal points belonging to an initial constellation includes converting said data elements in said data sequence into groups of bits for selecting signal points from said initial constellation, and said groups of bits are arranged to ensure that said bits can be recovered from a channel-affected version of said transmitted sequence which has been subjected to phase rotations of one, two, or three times 90 degrees.

34. The method of claim 13 wherein said initial sequence is a code sequence from a translate of a second code, said second code being of the trellis or lattice type.

35. Apparatus for mapping a digital data sequence into a signal point sequence for data transmission over a channel characterized by a non-ideal response, comprising means for accepting said digital data sequence, and a signal point selector for selecting said signal point sequence from a subset of all possible signal point sequences based on said digital data sequence and upon said response, all said possible signal point sequences in said subset lying in a fundamental region of a filtered trellis code, said fundamental region being other than a simple Cartesian product of finite-dimensional regions.

36. A modem for transmitting and receiving digital data sequences via a channel comprising means for mapping a said digital data sequence into a signal point sequence for data transmission over a channel characterized by a non-ideal response, including a sequence selector for selecting said signal point sequence from a subset of all possible signal point sequences based on said digital data sequence and upon said response, all said possible signal point sequences in said subset lying in a fundamental region of a filtered trellis code, said fundamental region being other than a simple Cartesian product of finite-dimensional regions, a modulator for sending said signal points of said sequence via said channel, a demodulator for receiving a possibly channel-affected version of said signal point sequence from said channel, and means for recovering a digital data sequence from said possibly channel-affected version of said signal point sequence.

37. The modem of claim 36 wherein said means for recovering comprises an adaptive prediction filter, wherein, during data transmission, said prediction filter is kept fixed, and a g(D) element through which the final prediction error from the prediction filter is passed in order to reconstruct the equalizer error.

* * * * *

UNITED STATES PATENT AND TRADEMARK OFFICE
CERTIFICATE OF CORRECTION

PATENT NO. : 5,159,610

DATED : October 27, 1992

INVENTOR(S) : Vedat M. Eyuboglu and G. David Forney, Jr.

It is certified that error appears in the above-identified patent and that said Letters Patent is hereby corrected as shown below:

Col. 1, line 33; "Sep." should be --Sept.--.

Col. 6, line 25; "$\Lambda/\Lambda$" should be --$\Lambda/\Lambda^1$--.

Col. 6, line 32; "$\Lambda$" should be --$\Lambda^1$--.

Col. 6, line 33; "$\Lambda$" should be --$\Lambda^\infty$--.

Col. 6, line 34; "$\Lambda$" should be --$\Lambda^1$--.

Col. 9, line 14; "c(D)," should be --$c^1(D)$,--.

Col. 10, line 15; "$S^1 = S\pi_{1 \leq i \leq K} 2^{j-r}$" should be --$S^1 = S\pi_{1 \leq i \leq K} 2^{ji-r}$--.

Col. 11, line 8; "'post-cursor' ISI" should be --'post-cursor ISI'--.

Col. 17, line 56; "1=1" should be --$\ell=1$--.

Col. 23, line 21; "diqital" should be --digital--.

UNITED STATES PATENT AND TRADEMARK OFFICE
CERTIFICATE OF CORRECTION

PATENT NO. : 5,159,610
DATED : October 27, 1992
INVENTOR(S) : Vedat M. Eyuboglu, et al It is certified that error appears in the above-indentified patent and that said Letters Patent is hereby corrected as shown below:

On title page, item [56], "Reference Cited", "4,807,253 3/1989" should read --4,807,253 2/1989--.

Signed and Sealed this

Sixth Day of September, 1994

Attest:

BRUCE LEHMAN

*Attesting Officer*       *Commissioner of Patents and Trademarks*